June 5, 1945.   C. D. RYAN ET AL   2,377,523
MAIL TREATING MACHINE
Original Filed April 29, 1940   16 Sheets-Sheet 1

INVENTORS
Commodore D. Ryan
Frank P. Sager
BY
Blair, Curtis & Hayward
ATTORNEYS

June 5, 1945.  C. D. RYAN ET AL  2,377,523
MAIL TREATING MACHINE
Original Filed April 29, 1940  16 Sheets-Sheet 2

INVENTORS
Commodore D. Ryan
Frank P. Sager
BY
Blair, Curtis & Hayward
ATTORNEYS

June 5, 1945.   C. D. RYAN ET AL   2,377,523
MAIL TREATING MACHINE
Original Filed April 29, 1940    16 Sheets-Sheet 5

INVENTORS
Commodore D. Ryan
Frank P. Sager
BY
Blair, Curtis & Hayward
ATTORNEYS

June 5, 1945.  C. D. RYAN ET AL  2,377,523
MAIL TREATING MACHINE
Original Filed April 29, 1940  16 Sheets—Sheet 6

INVENTORS
Commodore D. Ryan
Frank P. Sager
BY
Blair, Curtis & Hayward
ATTORNEYS

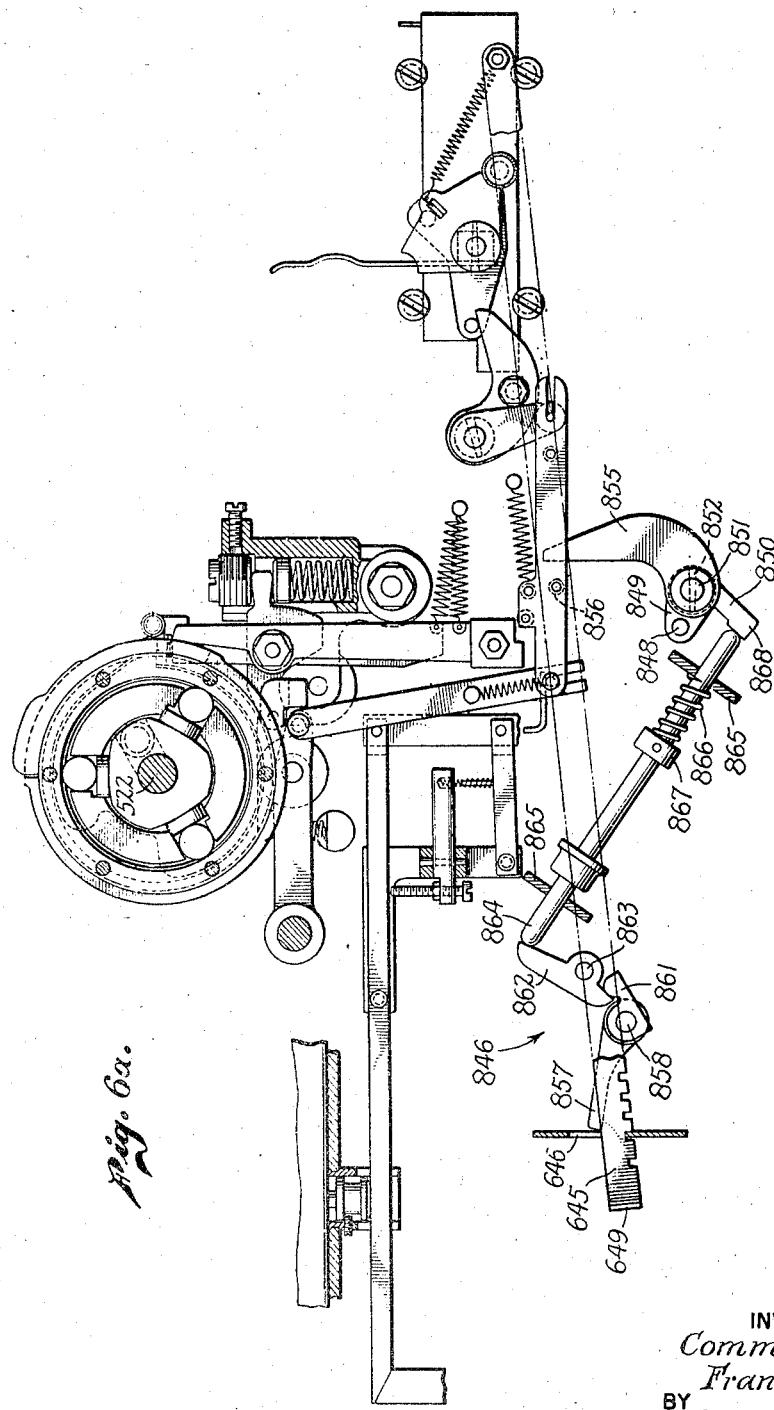

June 5, 1945.  C. D. RYAN ET AL  2,377,523
MAIL TREATING MACHINE
Original Filed April 29, 1940  16 Sheets—Sheet 9

INVENTORS
Commodore D. Ryan
Frank P. Sager
BY
Blair, Curtis & Hayward
ATTORNEYS

INVENTORS
Commodore D. Ryan
Frank P. Sager
BY
Blair, Curtis + Hayward
ATTORNEYS

June 5, 1945.  C. D. RYAN ET AL  2,377,523
MAIL TREATING MACHINE
Original Filed April 29, 1940    16 Sheets-Sheet 11

INVENTORS
Commodore D. Ryan
Frank P. Sager
BY
Blair, Curtis & Hayward
ATTORNEYS

June 5, 1945.　　　C. D. RYAN ET AL　　　2,377,523
MAIL TREATING MACHINE
Original Filed April 29, 1940　　16 Sheets-Sheet 12

INVENTORS
Commodore D. Ryan
Frank P. Sager
BY
Blair, Curtis & Hayward
ATTORNEYS

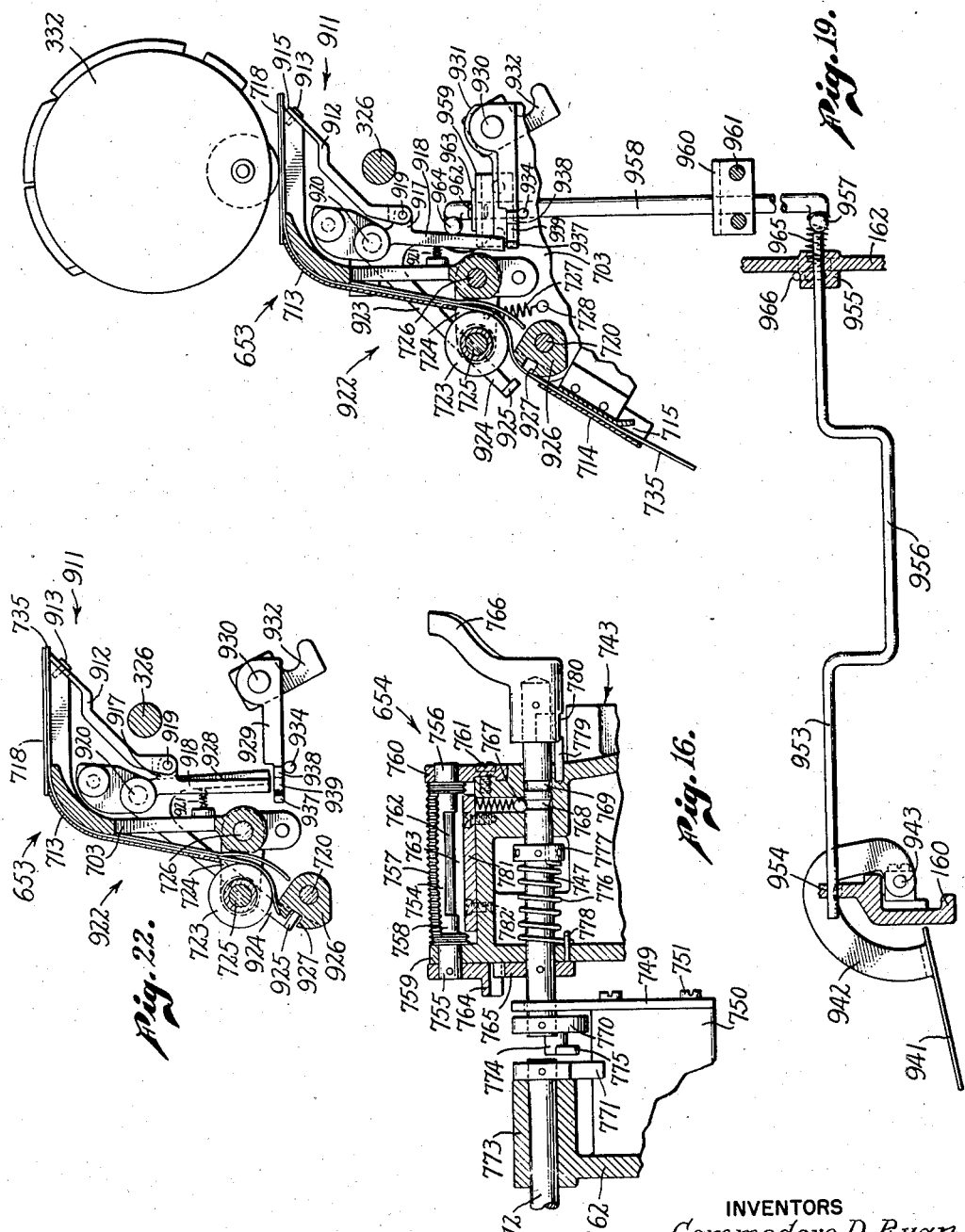

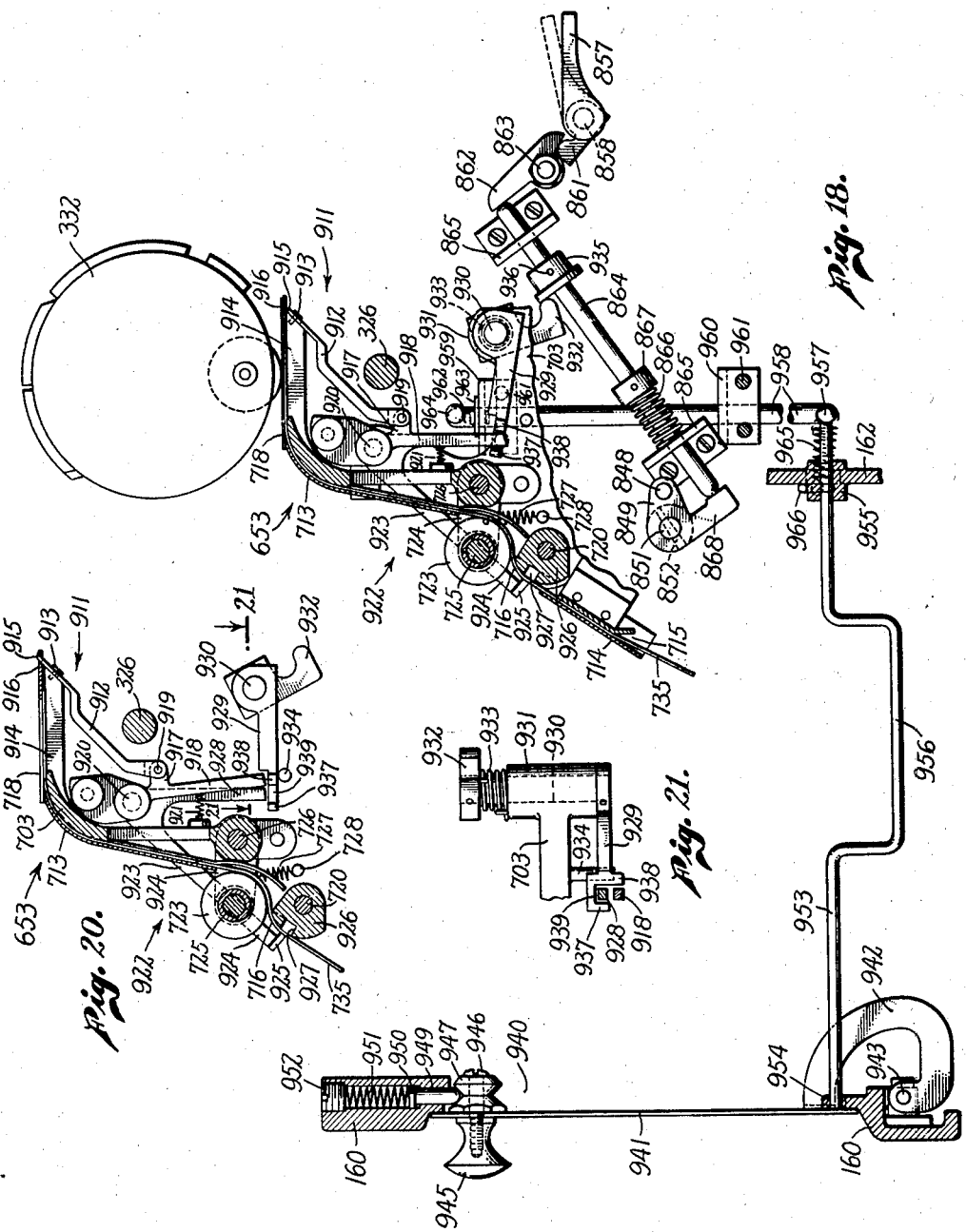

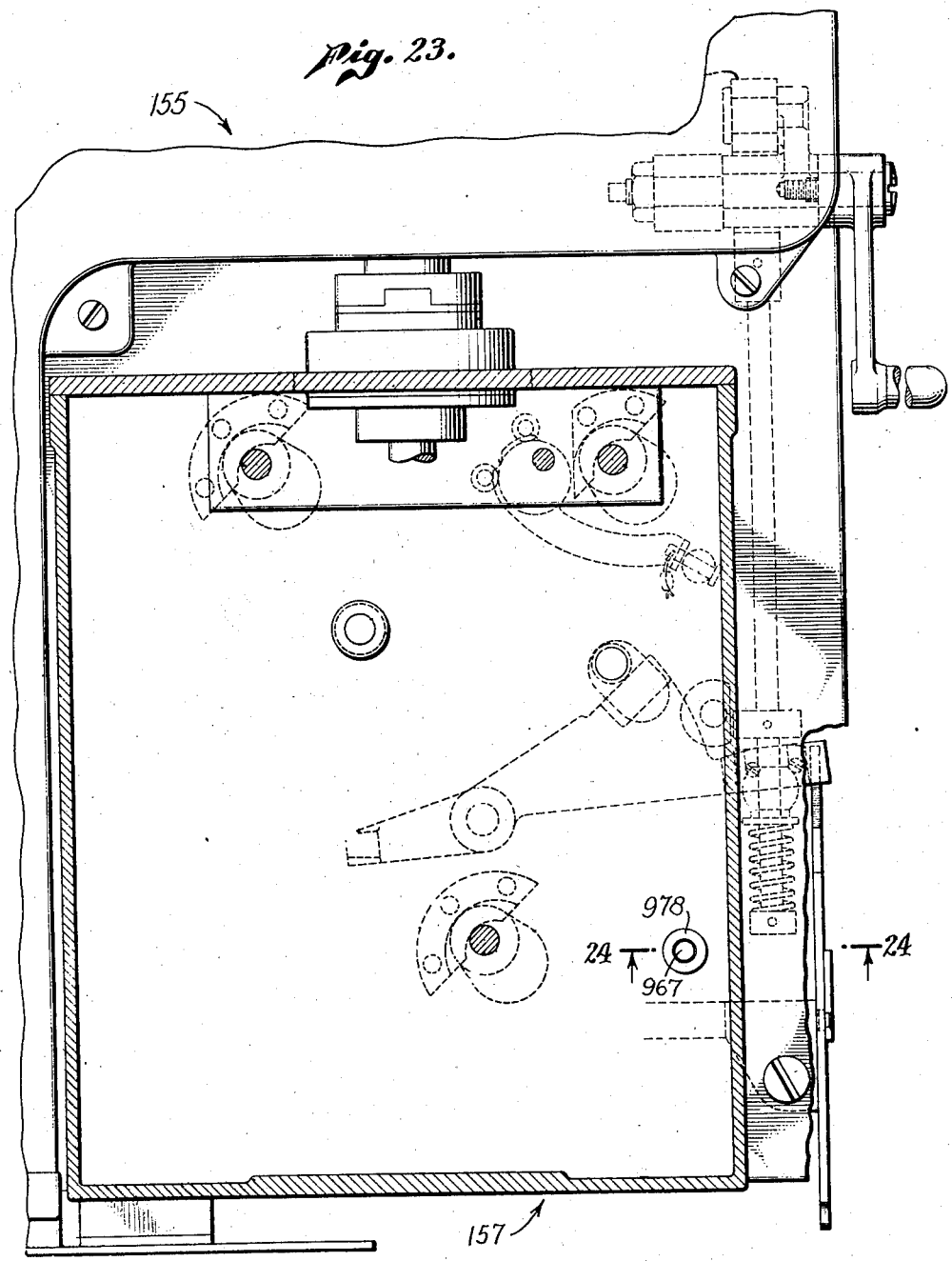

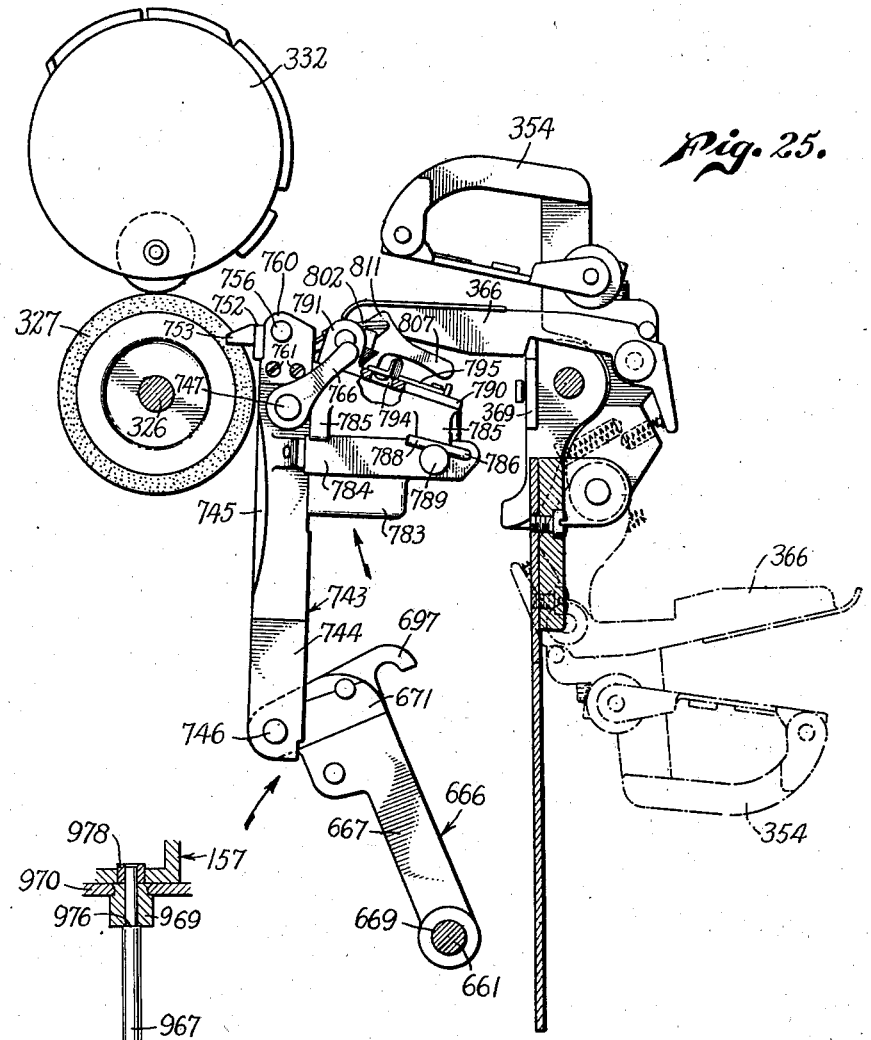
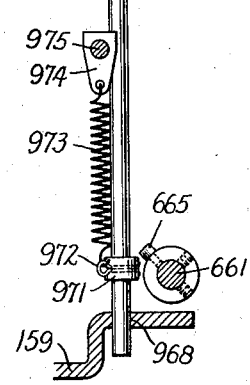

Patented June 5, 1945

2,377,523

UNITED STATES PATENT OFFICE 2,377,523

MAIL TREATING MACHINE

Commodore D. Ryan, Los Angeles, and Frank P. Sager, Alhambra, Calif., assignors to Commercial Controls Corporation, a corporation of Delaware Original application April 29, 1940, Serial No. 332,305. Divided and this application July 29, 1943, Serial No. 496,558

36 Claims. (Cl. 101—235)

This invention relates to a mail treating machine and more particularly to a device for feeding gummed tape or the like into a position for printing postage thereon or for being otherwise treated.

Many types of mailing matter which require postage are of such a nature that they cannot be passed through a mail treating machine in the manner of an envelope or cannot be printed on by the postage printing mechanism of the machine. Such articles must, accordingly, be stamped individually with a stamp or stamps of proper denomination. It is accordingly desirable that a mail treating machine be able to print on gummed tape or the like postage of the desired amount, so that the printed tape can thereafter be affixed to the mailing matter. In order for the mail treating machine to be useful for printing postage for all sorts of mailing matter, the tape feeding device should be of such a nature as to permit its being shifted at will from a non-printing position to a printing position, and from a printing position to non-printing position. Furthermore, the tape feeding mechanism should also be able to cooperate with a moistening device so that if postage is printed on strip tape, the tape may be cut off at the end of each operating cycle and moistened as desired. It is accordingly one of the objects of this invention to provide a retractable tape feeding mechanism for a mailing machine capable of efficiently fulfilling the several functions noted above, in addition to others.

The invention accordingly consists in the features of construction, combinations of elements, and arrangements of parts as will be exemplified in the structure to be hereinafter described and the scope of the application of which will be indicated in the following claims.

This application is a division of the application of Frank P. Sager et al., Serial No. 332,305, filed April 29, 1940.

In the drawings,

Figure 6A illustrates a developed, diagrammatic view of the automatic and manual clutch tripping mechanism and its relation to a portion of the tape feeding device;

Figure 1:
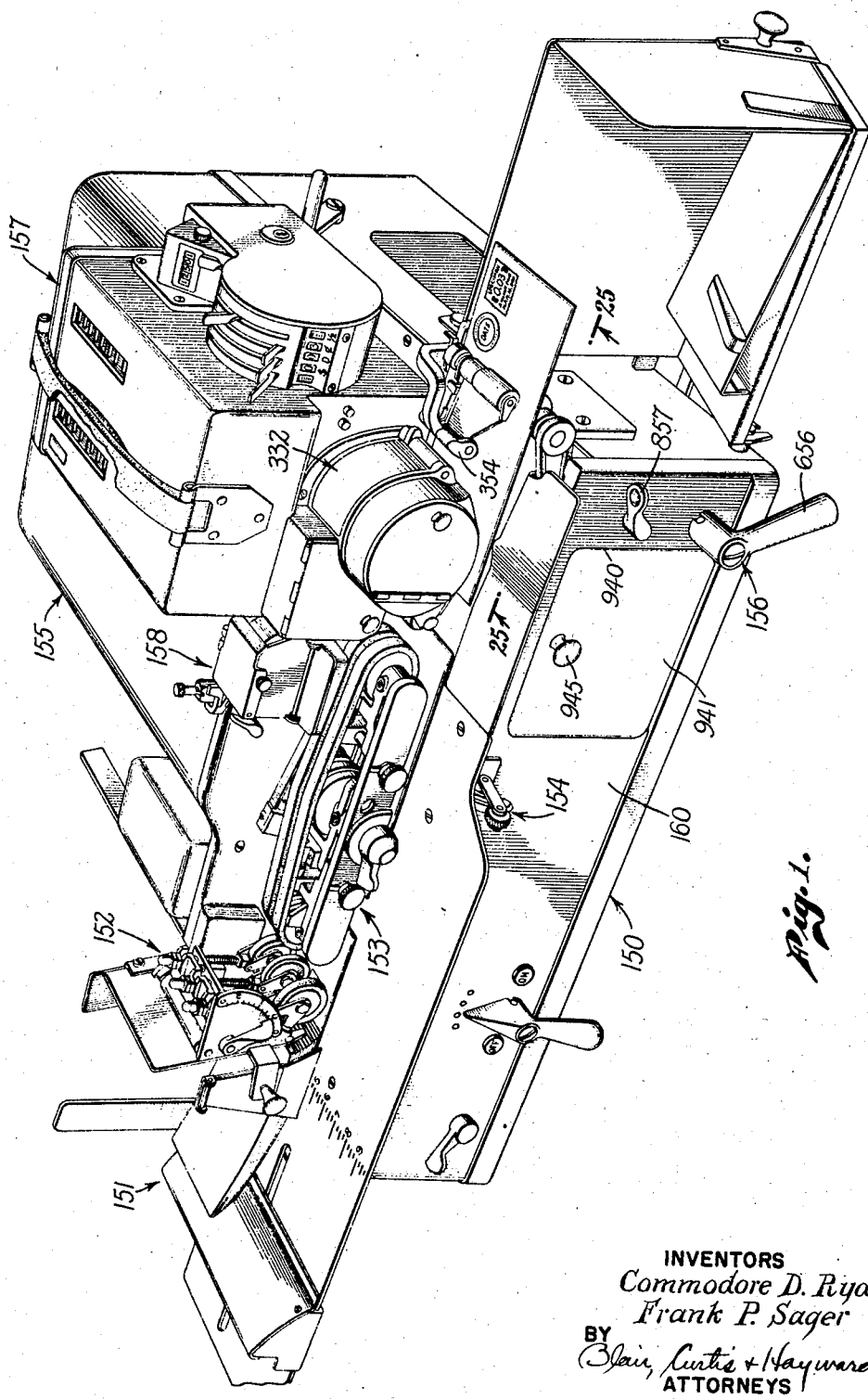
Figure 1 is a perspective view of the machine.
Figure 2:
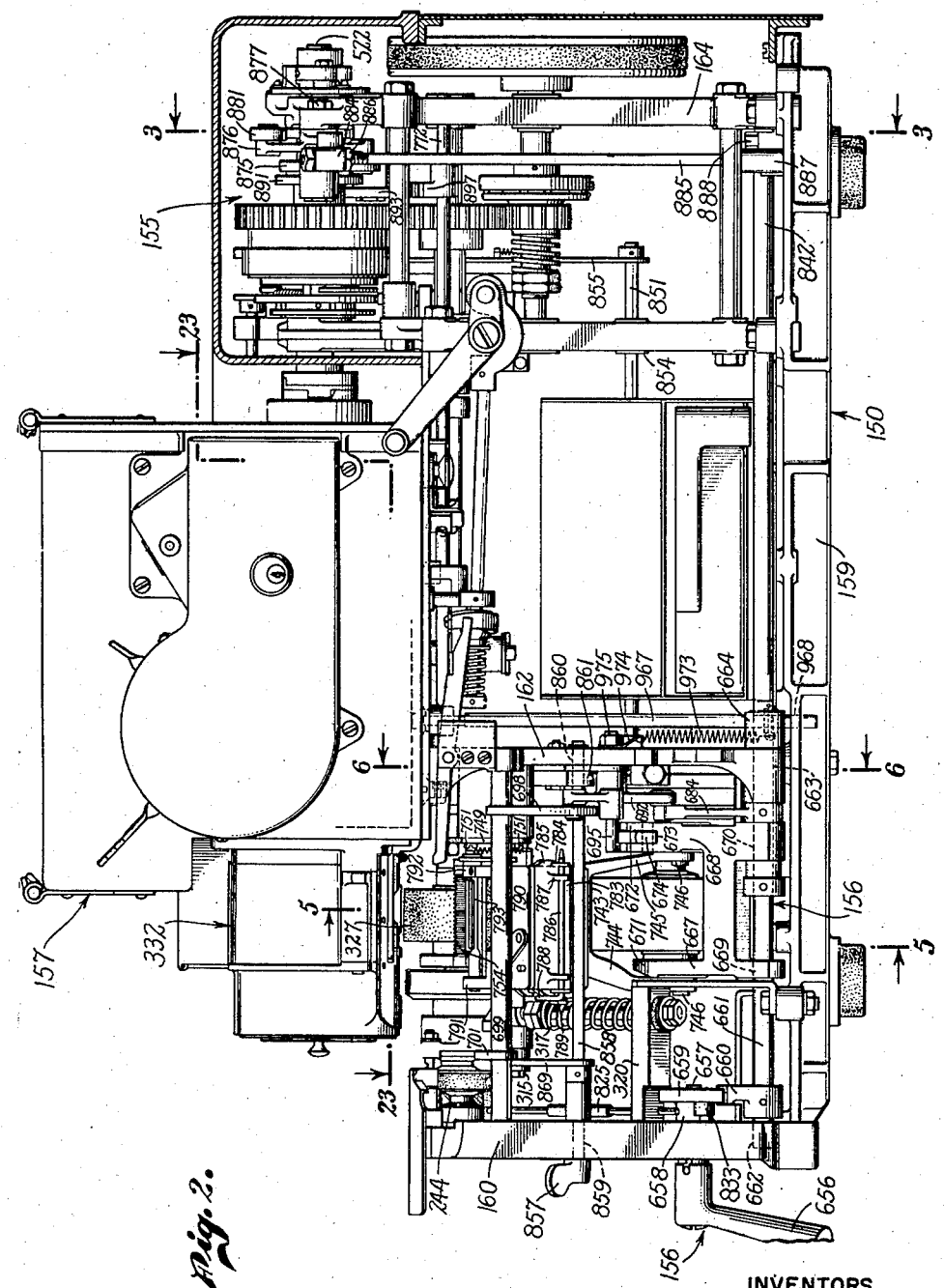
Figure 2 is a sectional elevation showing a portion of the right-hand end of the machine from which the end cover plate has been removed.
Figure 4:
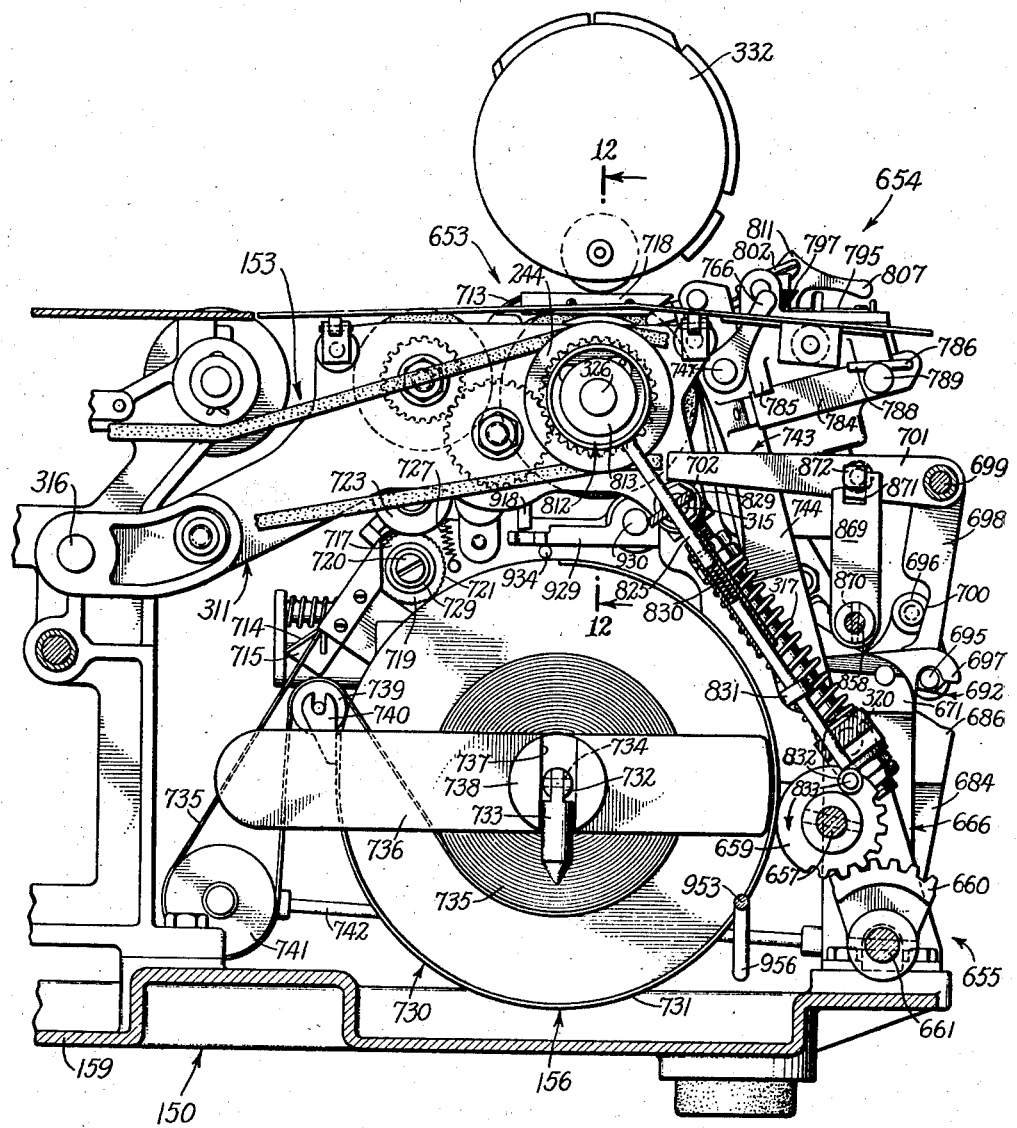
Figure 4 is a fragmental sectional view showing in enlarged detail the tape feeding device in printing position and showing the means for maintaining the conveyor mechanism clutch in its inoperative position.
Figure 7:
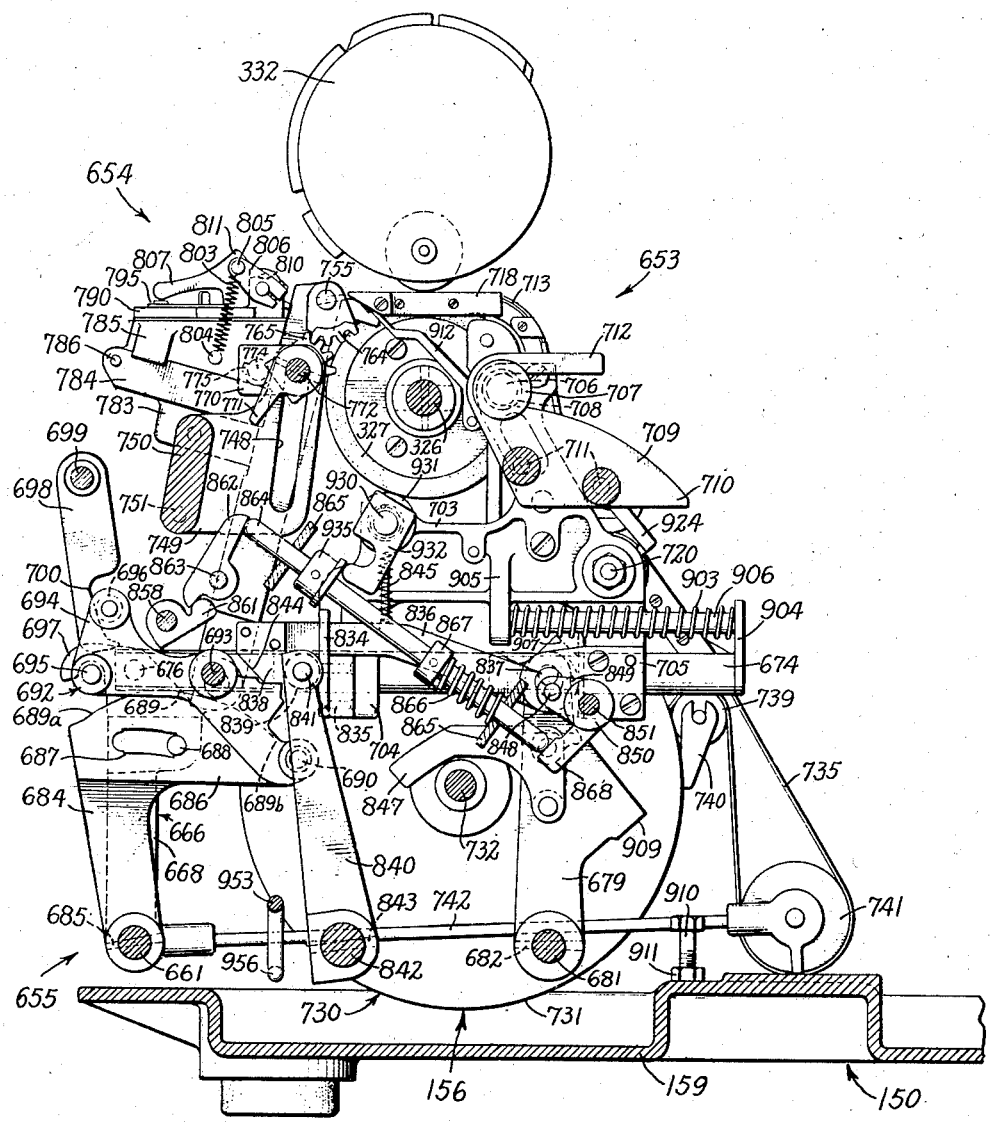
Figure 7 is a view similar to Figure 6, but showing the tape feeding device in its printing position.
Figure 8:
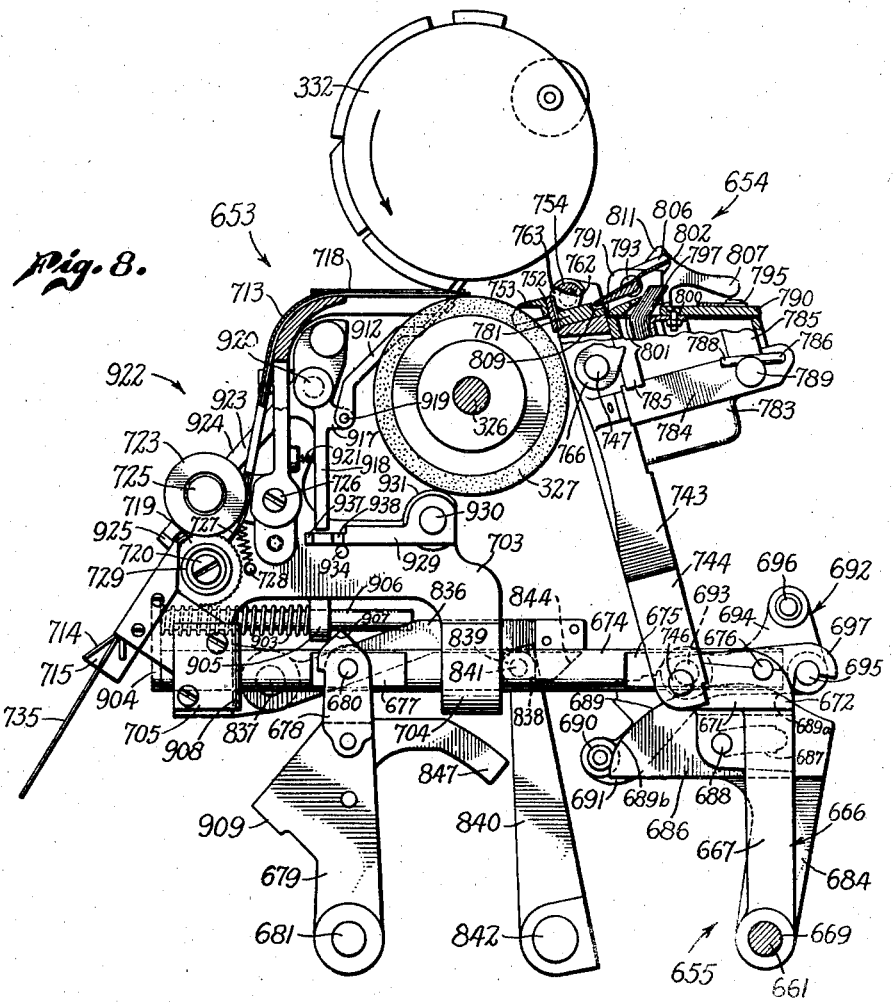
Figure 8 is a fragmental view of the upper position of the tape feeding device shown in Figure 5, and illustrating the shuttle of the tape feeding device as it would appear at the start of the printing operation.
Figure 10:
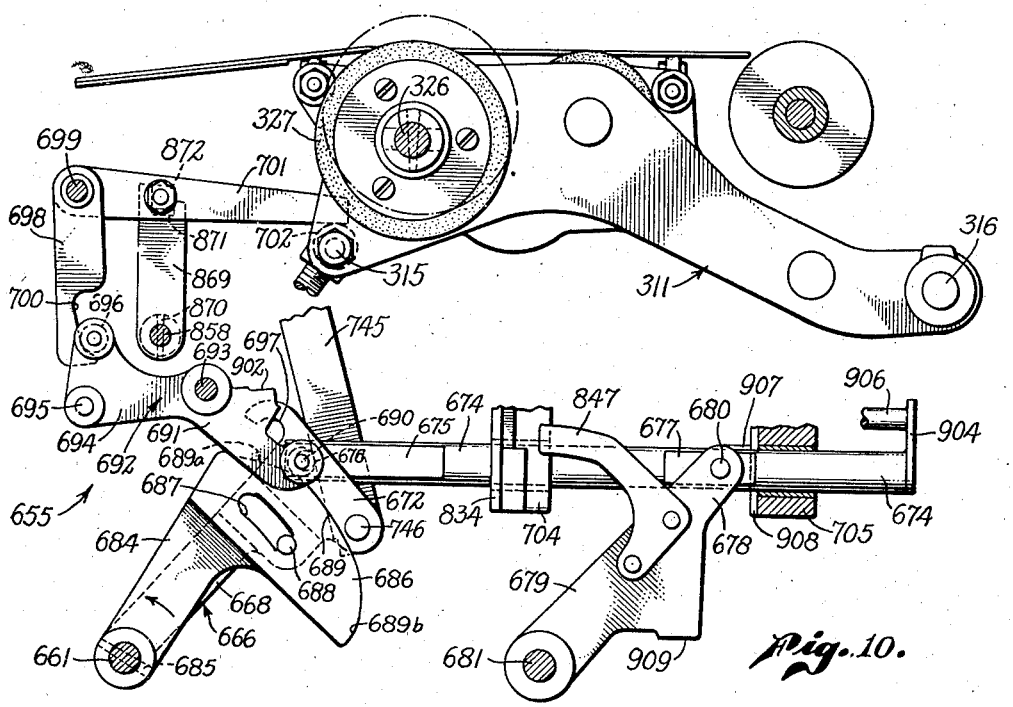
Figure 11:
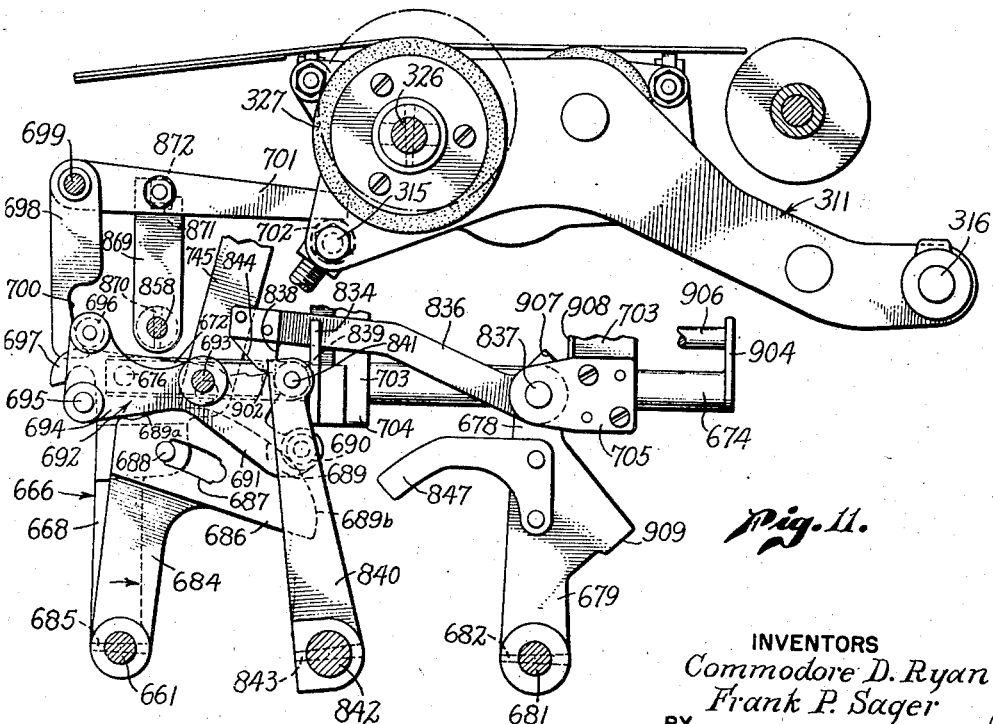
Figure 12:
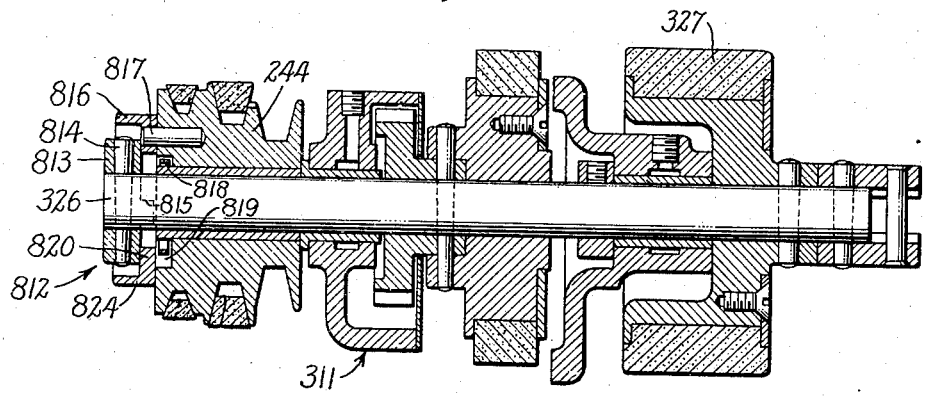
Figure 13:
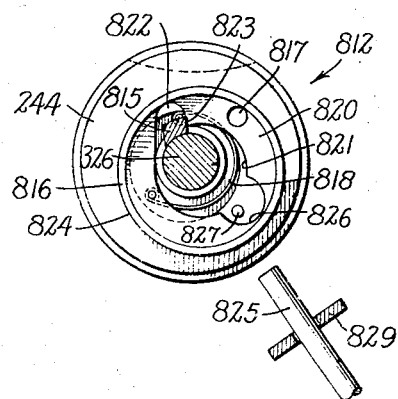
Figure 14:
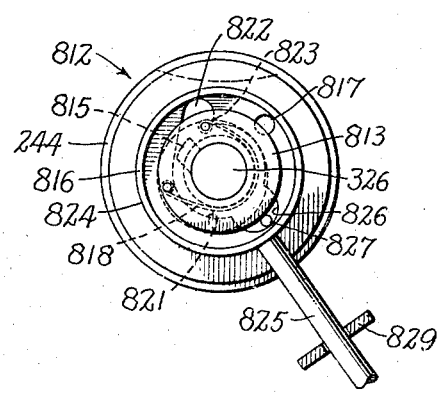
Figure 15:
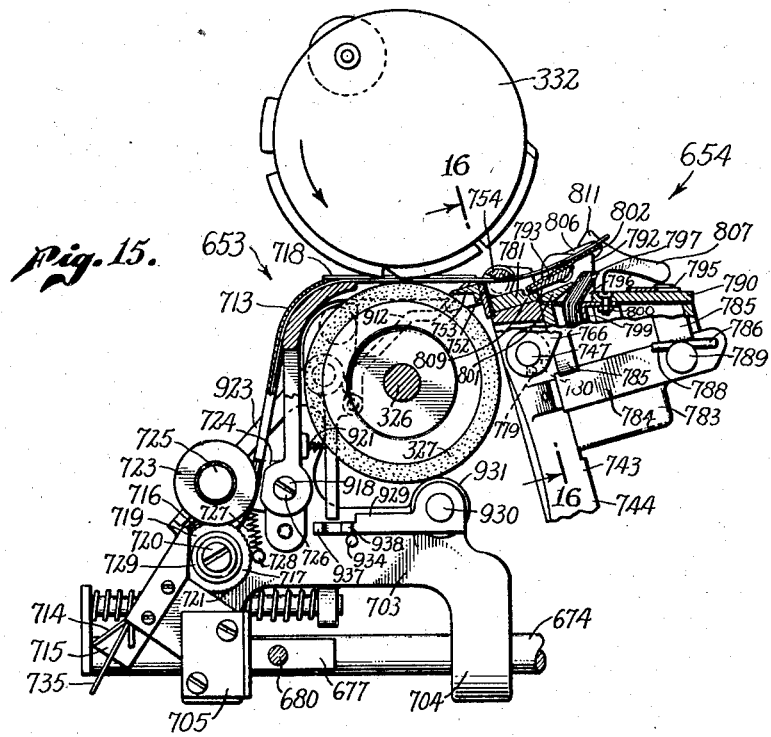
Figure 17:
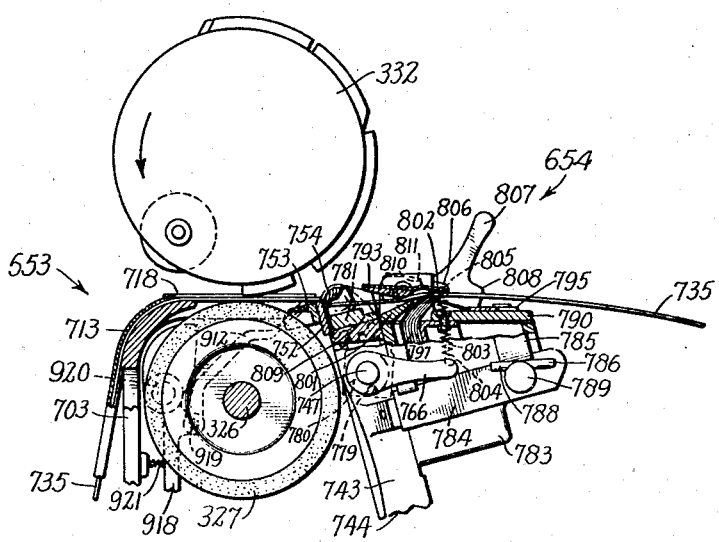

Figure 10 corresponds generally to Figure 7, but in addition shows the platen roller swing frame to illustrate the manner in which the platen roller is displaced to show the tape feeding device in resting position;

Figure 11 is similar to Figure 10, and shows the manner in which the platen roller is lowered just prior to the tape feeding device in its retracted inoperative position;

Figure 12 is a fragmental sectional view taken substantially along the line 12—12 of Figure 4;

Figure 13 is an enlarged fragmental sectional view illustrating the envelope feed conveyer driving clutch in engaged position;

Figure 14 is a view similar to Figure 13 but showing the envelope conveyor driving clutch disengaged;

Figure 15 is a view similar to Figure 8 but showing the shuttle returned to normal position during the printing operation and further showing the setting of the device to guide the printing tape clear of the moistening brush;

Figure 16 is a fragmental sectional view taken substantially along the line 16—16 of Figure 15 to illustrate in detail the tape cutting mechanism;

Figure 17 is a view similar to Figure 15 but shows the parts as they would appear at the completion of the printing operation, but showing the printing stamp crossing the moistening brush;

Figure 18 is a composite view of the upper portion of the tape feeding mechanism, the tape compartment door, and the interlocking mechanism thereof;

Figure 19 is a view similar to Figure 18 with the exception that the tape compartment door is shown open, in which position the interlocking mechanism will operate to retract the tape safety fingers to facilitate threading of tape into the device;

Figure 20 illustrates the upper portion of the tape feeding device and shows the manner in which the interlocking mechanism will operate to lock the mechanism against operation when the cut end of the tape is out of position;

Figure 21 is a fragmental sectional view taken along the line 21—21 as viewed in Figure 20;

Figure 22 is a view similar to Figure 20 with the exception that it shows the operation of the interlocking mechanism to lock the machine against operation when there is an insufficient amount of tape to complete the printing when a full stamp remains in the machine;

Figure 23 is an enlarged fragmental sectional view taken generally along the line 23—23 of Figure 2 and showing the meter locked in its operative position on the power plant;

Figure 24 is a sectional view taken substantially along the line 24—24 of Figure 23, showing the means for locking the meter to the power plant while the tape feeding device is in its operative position; and Figure 25 is a fragmental sectional view taken generally in the plane of line 25—25 of Figure 1 to illustrate the relationship between the final sealer rollers and the tape feeding device.

General description

The preferred embodiment of the mail treating machine illustrated in the drawings is an all-purpose machine, i. e., a machine capable of ready adjustment for handling and treating all types and classes of mailing matter. This machine is capable of treating such mail matter at high speed and under full control and with protection against waste of postage or unauthorized use, and, in addition to its ability to treat and stamp envelopes of various lengths, widths and thicknesses, the machine is capable of selectively printing postage as desired on strip tape and delivering the printed tape in severed lengths, moistened or unmoistened, as desired.

This machine accordingly incorporates a tape feeding device which is selectively operable into and out of operative position, and which is characterized by various advantageous features which will be dealt with in greater detail hereinbelow.

As shown in Figure 1, the mail treating machine includes generally the following major elements and mechanisms which for convenience are identified by the general reference numbers preceding each:

150—Frame structure
151—Feed hopper
152—Stripper
153—Conveying and feeding system for the mail matter
154—Envelope flap moistening device
155—Power plant and driving mechanism
156—Tape feeding device
157—Postage meter
158—Ink feeding mechanism for the meter All of these elements, in addition to others, are described in detail in the above-noted Sager et al. application. The description herein is directed primarily to the tape treating mechanism.

Figure 9:
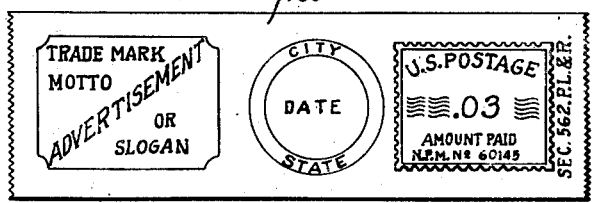
Figure 9 illustrates a three-cent postage stamp, town circle, date, and advertising slogan printed upon a section of gummed tape.

The mechanism by means of which the tape feeding device 156 is moved from its non-printing to its printing position also operates means for rendering the envelope conveyer system 153 inoperative, to prevent simultaneous feeding of mail matter and tape. This mechanism also renders the manual trip device operative so that upon each successive manipulation of said trip the clutch control mechanism will be actuated to engage the meter driving clutch for a cycle of operation to print a stamp of selected value upon a strip of gummed tape as shown in Figure 9.

The positioning mechanism for the tape feeding device while operating to return said device from its printing to its non-printing position will operate to automatically return the conveyor system to its operative condition and to render the manual clutch trip device inoperative.

The tape feeding device is provided with safety control means to prevent operation of the machine unless it is in condition to print a perfect stamp.

The tape feeding device 156 (Figure 5) may be generally divided into three different portions, namely the tape feed portion 653, tape cutting and moistening portion 654 and the positioning portion 655.

The tape feeding portion and the tape cutting and moistening portion of the device are separable to enable these to be brought up over the platen roller from each side so as to straddle the roller when moved up into printing position and to divide and retract in the reverse order when these two portions are moved to their non-printing positions.

The positioning portion 655 of the device may include a positioning handle 656 fastened to the forward end of stub shaft 657 journaled in bearing boss 658 (Figure 2) formed on front plate 160. A segmental pinion 659 (Figures 2 and 4) is securely fastened upon the inner end of stub shaft 657, and meshes with a gear segment 660, securely fastened upon the positioning shaft 661. As shown in Figure 2, the positioning shaft is journaled in the front frame plate 160 as at 662 and in the meter supporting bracket 162 as at 663 and extends rearwardly of this bracket upon which extension a retaining collar 664 is securely fastened as by a suitably headed set screw 665 (Figures 2 and 24).

A positioning and latching lever 666 generally H-shape in form includes a pair of spaced apart upwardly extending arms 667 and 668 pivotally mounted at their lower ends upon positioning shaft 661 as by means of bearings 669 and 670 and provided at their upper ends with off-set lugs 671 and 672 which lugs extend in planes perpendicular to the pivotal axis of said lever. The positioning lever lug 672 is bifurcated as at 673 to receive one end of connecting rod 674, flattened on each side as at 675 to fit within the bifurcated portion of lug 672 and pivotally connected to the lug by pin 676. The rod intermediate its ends is provided with a second flattened portion as at 677 to fit between the bifurcated end 678 of lever 679 and fastened to the bifurcated portion of the lever by pivot pin 680. Lever 679 at its lower end is fastened to stub shaft 681 by taper pin 682 and the stub shaft 681 is journaled in bearing 683 (Figure 5) on the meter supporting bracket 162.

Levers 666 and 679 are of the same length to maintain connecting rod 674 horizontal throughout the swinging action of these levers.

An actuating lever 684 is keyed upon shaft 661 by means of taper pin 685 and at its free end is provided with head 686 extending in a plane perpendicular to the axis of shaft 661. The head portion 686 of this lever is provided with an arcuate slot 687 cooperating with a suitable driving pin 688 extending from the side wall of the positioning lever lug 672. This pin and slot arrangement provides a lost motion driving connection between the actuating lever 684 and positioning lever 666 whereby the actuating lever may be swung through a given arc of travel before the pin engages the end of the slot.

The actuating lever head 686 is provided with a cam surface 689 engaged by cam roller 690 carried by arm 691 of bell crank lever 692.

The intermediate portion of the actuating lever cam surface 689 is concentric with relation to the axis of rotation of said lever while its two end portions 689a and 689b are sloped downwardly to provide actuating surfaces for rocking the bell crank lever 692.

The bell crank lever 692 is pivotally mounted upon the front side face of the meter supporting bracket 162 as by means of pivot pin 693 and the other arm 694 is provided with a locking pin 695 and a cam roller 696 each of which project forwardly from the side face of said bell crank lever.

Figure 6:
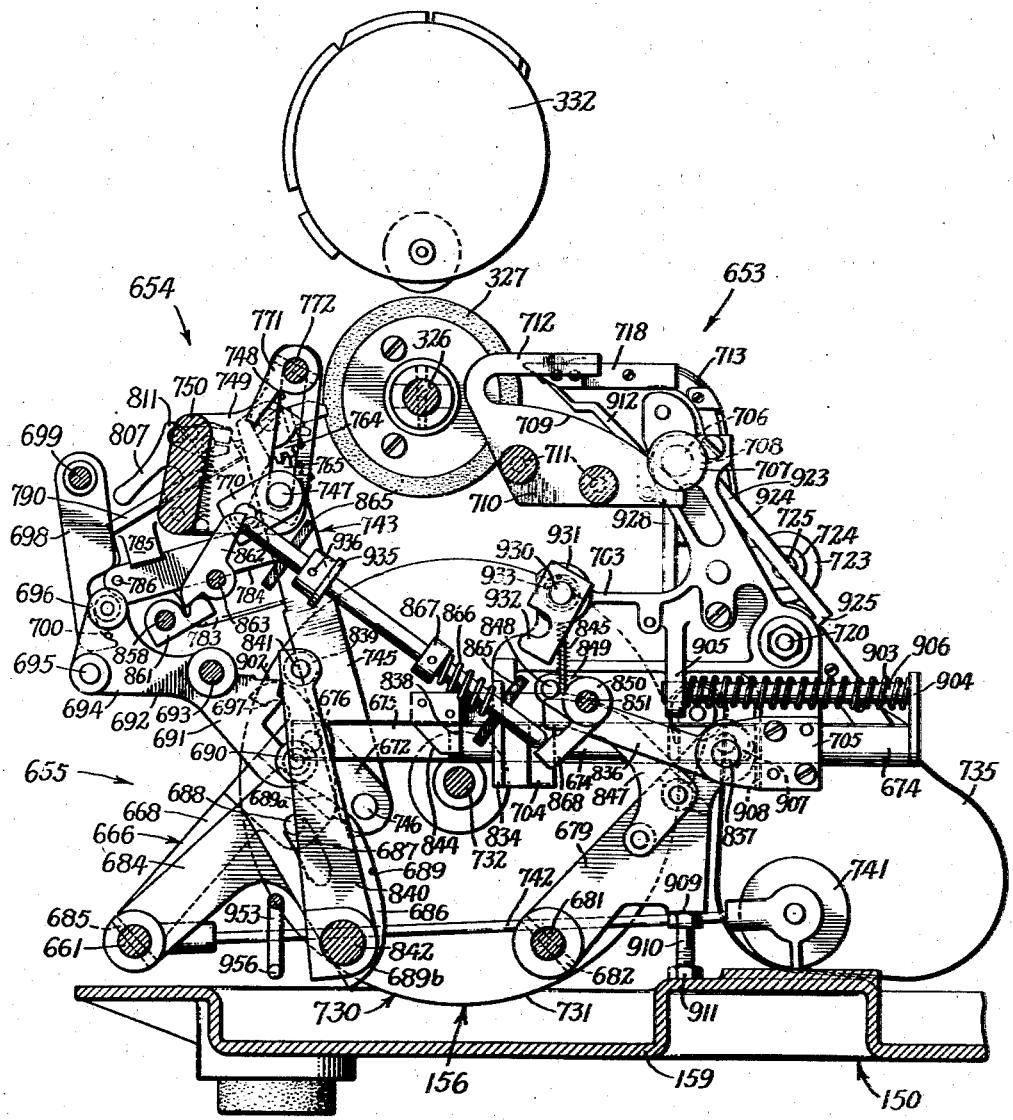
Figure 6 is an enlarged fragmental sectional view taken substantially along the line 6—6 of Figure 2 to show the tape feeding device in its retracted inoperative position.

To raise the tape feeding device from its non-printing position as shown in Figure 6 to its printing position of Figure 7, the positioning handle 656 will be manipulated to rotate the positioning shaft 661 with its attached actuating lever 684 in a counter-clockwise direction as viewed in these figures.

The initial rotation of actuating lever 684 will swing the sloping portion 689a of its cam surface 689 under the bell crank cam roller 690 to thereby rock the bell crank lever in a counter-clockwise direction as viewed in these same figures. This rocking of the bell crank lever 692 serves two purposes, the first of which is to lower its locking pin 695 to clear the hook 697 formed upon the upper end of the positioning lever arm 668 opposite its lug 672 and the second purpose is to lower the platen roller 327 to enable the tape feeding portion and the cutting and moistening portion of the device to be brought into printing position.

The mechanism actuated by the bell crank 692 for lowering the platen roller 327 includes a cam lever 698 fastened to cross shaft 699 which shaft is pivotally supported at its ends in the front frame plate 160 and meter bracket 162. The cam lever 698 is provided at its free end with cam surface 700 engaging cam roller 696 and through this engagement the cam lever is rocked in a clockwise direction as viewed in Figure 6 when the bell crank 692 is actuated as described above. The action thus far described is illustrated in Figure 10.

A finger 701 is fastened to cross shaft 699 and at its free end engages an eccentric collar 702 adjustably mounted upon the platen swing frame spacer bolt 315. Rotation of cross shaft 699 by means of its cam lever 698 will swing the free end of finger 701 downwardly thereby swinging the platen frame about its pivot shaft 316 against the yielding force of its compression spring 317 and as a result lowering the platen roller 327. (Figure 10.)

The positioning lever 666 remains stationary during the initial movement of actuating lever 684 while lowering the platen roller 327, due to the slot and pin connection formed between these two levers.

After the platen roller 327 has been depressed in manner described, the end of the actuating lever slot 687 will engage the positioning lever driving pin 688 and from this point the two levers will move in unison to bring the tape feeding device into printing position.

During the final portion of the movement of actuating lever 684, the sloping portion 689b of its cam surface will swing under the bell crank cam roller 690 (Figure 7) and due to the action of the platen swing frame compression spring 317 and the mechanism connecting the platen swing frame to the bell crank lever, its cam roller 690 will travel down this portion of the cam surface and as a result the bell crank 692 will rotate in a clockwise direction.

Through the action of the compression spring 317 against the platen roller swing frame 311 and the above described depressing mechanism, the bell crank cam roller 690 is maintained in pressure contact with the cam surface 689 of the actuating lever 684 and as the actuating lever 684 swings through its final movement the bell crank cam roller 690 follows the downwardly sloping portion 689b of said cam surface, thereby causing the bell crank 692 to rotate in a clockwise direction as viewed in Figures 6 and 7, thus permitting the platen roller to return to its normal printing position.

This clockwise rotation of the bell crank 692 lifts locking pin 695 into locking engagement with the positioning lever hooked portion 697 thereby locking the tape feeding device in its printing position.

When the tape feeding device is to be moved from its printing position as shown in Figure 7 to its non-printing position of Figure 6, the actuating lever 684 will be turned in a clockwise direction as viewed in these figures, through the manipulation of the positioning handle 656. The slot and pin connection formed between the actuating and positioning levers, will permit an initial movement of the actuating lever independent of the positioning lever to actuate bell crank 692 for unlocking the positioning lever and for depressing the platen roller 327 in the manner previously set forth. This action is shown in Figure 11.

The continued rotation of the actuating lever 684 will, through the pin and slot connection, return the positioning lever 666 and thereby the two portions of the tape feed device to their retracted or non-printing positions, and during the final rotation of actuating lever 684, its sloping cam surface 689a will swing under the bell crank cam roller 690 thereby permitting the bell crank lever 692 to rotate in a clockwise direction as viewed in Figure 6 to permit the platen roller to return to its raised position in the manner previously described.

From the above description, it will be appreciated that the tape feed device 156 may be easily and quickly moved to or from its printing position through the simple manipulation of the positioning handle 656.

*Tape feed portion 653 of the tape feeding device 156*

The tape feed portion 653 (Figure 6) of the tape feeding device 156 includes a frame member 703 provided at its lower portion with an inner bearing 704 and a spaced outer bearing 705 slidably mounted upon the positioning structure connecting rod 674.

To maintain frame 703 in proper position during all of its movements the upper end thereof is provided with a transverse pivot pin 706 upon the outboard end of which is fastened a collar 707 having an annular groove 708 which groove receives the guide surface 709 of guide plate 710. The guide plate is mounted upon the front face of meter bracket 162 as by means of suitable screws 711.

The guide plate 710 is shaped as shown most clearly in Figure 6. The guide surface 709 thereof is curved to substantially coincide with the path of travel of the grooved collar 707 during the raising or lowering movement of the tape feeding device to or from its printing position. The guide plate 710 is provided with a horizontally extending guiding surface 712 overhanging in spaced relation the guide surface 709 for guiding the grooved collar when the tape feed portion 653 of the device is shuttled during a tape printing cycle of operation.

A tape guide chute 713 is mounted upon frame member 703 and includes an entrance portion 714 flared as at 715 (Figures 5, 8 and 19) to facilitate entrance of tape therein.

The guide chute above its entrance end is provided with reverse curve portion 716 having suitable openings for a manual feed roller mechanism 717 which mechanism is employed when threading tape into the chute.

From the reverse curve portion 716 the chute extends upwardly and is provided with a horizontal portion 718 at which portion the chute is open at its top and bottom to straddle the platen roller 327 and the printing plates carried by the printing drum.

The manual feed roller mechanism 717 may include a feed roller 719 journaled upon frame member 703 by bearing pin 720. The feed roller 719 is preferably provided with ratchet like teeth 721 against which one end of a leaf spring 722 acts to prevent reverse rotation of said roller. The opposite end of leaf spring 722 is fastened to the underside of the tape chute in any suitable manner. The ratchet like teeth 721 also act against the gummed surface of the tape to assist in propelling the tape through the chute. A pressure roller 723 is journaled upon the free end of lever 724 by bearing pin 725 while lever 724 is pivotally attached to frame member 703 by pivot pin 726. A tension spring 727 acting between lever 724 and spring pin 728 carried by the frame member 703 acts to yieldingly press the tape against the teeth of feed roller 719.

The feed roller 719 is provided with a forwardly extending knurled sleeve portion 729 for manually turning the feed roller when threading tape into the chute.

A tape roll magazine 730 may include a housing 731 fastened to the intermediate portion of shaft 732. One end of said shaft is securely mounted in the meter bracket 162 in any suitable manner not shown. The forward end of shaft 732 is provided with an extension 733 pivoted to said shaft by hinge pin 734.

To mount a roll of gummed tape 735 in the magazine, the shaft extension 733 should be moved into axial alignment with the shaft and thereafter the roll of tape may be slid onto the shaft and into the housing. After the roll of tape has been mounted within the housing, a retaining plate 736 may be positioned on the shaft and the shaft extension 733 swung downwardly into slot 737 formed in the hub portion 738 of said plate in the manner shown in Fig. 4.

The housing 731 is cut away to permit the tape to feed therefrom and a roller 739 is journaled in brackets 740 carried by the housing to guide the tape as it feeds down under the loop forming roller 741. The tape 735 loops around roller 741 and extends up into and through the tape chute 713.

Figure 5:
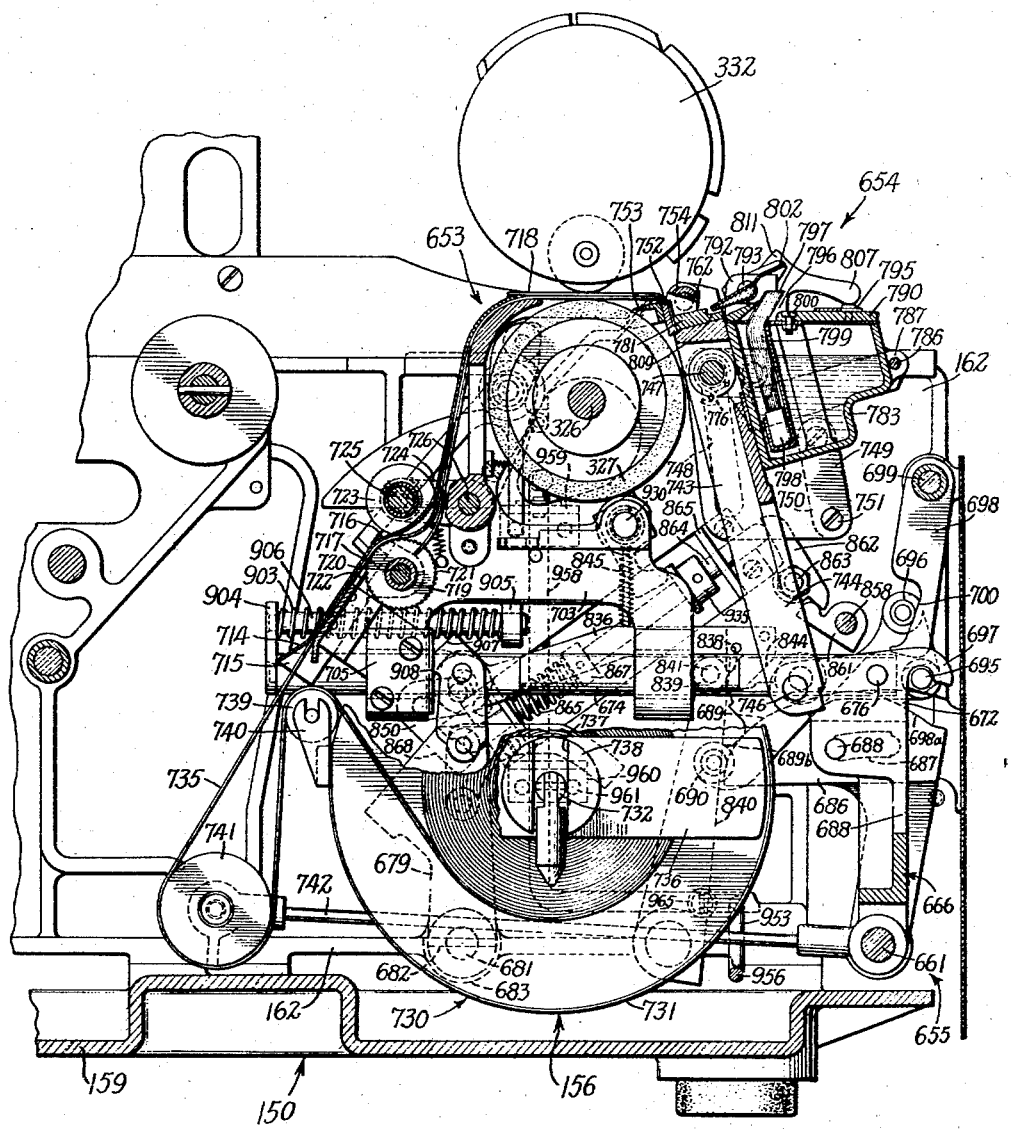
Figure 5 is an enlarged fragmental sectional view taken substantially along the line 5—5 of Figure 2 to show in detail the tape feeding device in its rest position.

The loop forming roller 741 is journaled upon the forward end of swing arm 742 which arm at its opposite end is pivotally mounted upon the positioning shaft 661 (Fig. 5).

The loop forming device pulls from the roll a sufficient amount of tape to provide for the printing of a stamp and maintains this loop under proper tension to insure a uniform resistance during the printing of the stamp independent of the amount of tape remaining on the roll.

During the printing of a stamp the tape is rapidly pulled through the tape chute 713 and if the tape was passed directly from the roll to and through the chute it would tend to rupture in its attempt to overcome the inertia of a full heavy roll or if said tape did not rupture, it would tend to spin the roll unwinding more tape than necessary and as a result the tape would pile up and foul in the magazine or between the magazine and entrance to the chute, thus rendering the operation unreliable.

When a roll of tape becomes used up, a new roll may be easily and quickly mounted in the magazine in the manner previously described and likewise easily and quickly threaded into proper printing position in the tape chute by pulling out from the new roll a sufficient length of tape to place it over roller 739, under the looping roller 741 and into the entrance portion of the chute unit the end of the tape engages the manual feed roller mechanism 717 whereupon the operator may easily feed the tape through the remaining portion of the chute by turning the knurled sleeve 729 of said feed mechanism.

If an excessive length of tape has been unwound from the roll for the purpose of threading the tape into the chute, this excessive tape may be rewound up the roll.

Referring to Fig. 4, it may be observed that the retaining plate 736 is made of sufficient length to provide a guide for maintaining the tape upon rollers 739 and 741.

*The tape cutting and moistening portion 654 of the tape feeding device 156*

The tape cutting and moistening portion 654 (Fig. 8) of the tape feeding device 156 may include a frame member 743 having two spaced legs 744 and 745 pivotally connected to the positioning lever lugs 671 and 672 by means of axially aligned pivot pins 746.

A rock shaft 747 is journaled in the upper portion of frame member 743 and at its inner end extends through slot 748 formed in guide plate 749 which guide plate is securely fastened to a suitable boss 750 (Fig. 2), extending forwardly from the front face of the meter bracket 162, by means of screws 751.

This guide connection formed between the guide plate 749 and frame member 743 acts to guide this portion of the device into proper register with the tape feeding portion 653 when moved into printing position.

When the tape feeding device 156 is in printing position the tape cutting and moistening portion thereof will register with the tape feeding portion 653 as shown in Figures 4, 5, 15, and 17.

When in this position the cutter mechanism of this portion of the device receives the tape as it is discharged from the end of the tape chute 713. The cutter mechanism may include a stationary blade 752 securely fastened to the upper end of frame member 743 in any suitable manner and has a lip portion 753 to provide an inclined guide surface for directing the tape as it leaves the chute into the cutter mechanism. The cutter mechanism also includes an oscillatory cutter blade 754 which is journaled upon the upper portion of frame members 743 in any suitable manner so as to cooperate with the stationary blade for cutting off the printed stamp.

The oscillatory blade 754 is preferably made from a round bar of steel turned down at each end to provide aligned concentric supporting shafts 755 and 756 (Figure 16). The center portion of the bar between the supporting shafts has a series of annular V shaped grooves 757 turned therein and the bar is milled out as at 758 (Figures 15, 16, and 17). The frame member is provided at its upper end with a fixed bearing 759 and a removable bearing 760 fastened to the opposite side of the frame member by screws 761 for operatively supporting the oscillatory cutter blade in the manner shown in Figure 16. The fixed cutter blade 752 is provided with a series of V grooves and the two cutters are mounted so that the teeth formed by one set of V grooves mesh with the grooves of the other whereby the cut ends of the tape stamp will be serrated as shown in Figure 9.

Attention is directed to Figure 16, wherein it may be observed that the milled out portion 758 of the oscillatory cutter blade is not taken straight across this member in a plane parallel to the axis of its supporting shafts, but instead is angled slightly from each edge to a center high point. This is for the purpose of starting the shearing cut at each edge of the tape and progressing the cut along the blade until it is finally completed at the center of said blade. This feature greatly reduces the force required in severing the tape as would be the case where the entire width of the tape is sheared simultaneously and as a result reduces the tendency of the oscillatory blade to flex or spring away from the fixed blade.

The milled out portion 758 of the oscillatory cutter blade is further milled to provide a clearance recess 762 (Figures 8, 15, 16, and 17) to prevent the freshly applied ink of the stamp from becoming smeared by the rear edge of this blade as the stamp passes thereunder.

As may be observed in the above mentioned figures, the oscillatory cutter blade overlies the upper shearing edge of the fixed blade to provide therebetween a narrow passageway 763 through which the tape enters when projected from the end of the tape feed chute 713 during the printing and ejection of the printed stamp. Due to this arrangement, the oscillatory cutter need be rotated only a small portion of a revolution to perform a cutting operation.

The oscillatory cutter may be automatically operated to cut off the printed stamp at the end of each operating cycle of the machine or may be disconnected from its automatic drive so that a number of stamps may be printed upon a single long strip of tape. Means are provided for manually operating the cutter when disconnected from the automatic drive.

The driving means for the oscillatory cutter includes fastening a gear sector 764 upon the end of cutter supporting shaft 755. The toothed portion of this gear sector is roughly twice the width of an actuating gear sector 765 fastened to rocker shaft 747 journaled in the frame member 743 in the manner previously described.

The oscillatory cutter is actuated either automatically or manually by the rocker shaft 747. A handle 766 is fastened to the forward end of this shaft for the purpose of manually actuating the cutter and also for setting the device for automatic or manual operation.

In Figure 16, the rocker shaft 747 is set for manual operation and maintained in this setting by the spring weighted ball 767 engaging an annular groove 768 formed in said shaft.

When the device is to be set for automatic operation, the operator by means of handle 766 may slide the shaft rearwardly through its supporting bearings until the ball engages a second annular shaft groove 769. This rearward movement positions an operating crank 770 fastened upon the rear end of said shaft in driving relation with lever 771 carried by the forward end of drive shaft 772 journaled in bearing boss 773 formed upon the meter bracket 162. Shaft 772 extends rearwardly to the power plant driving mechanism from which it is actuated in a manner to be described.

When the cutter is to be set for automatic operation, it is necessary to swing handle 766 downwardly to place the cutter in its cutting off position as shown in Figure 17 in order to position driving pin 774 carried by the operating crank 770 in front of the driving lever 771. The driving lever 771 stops at the end of each operating cycle in its cutting off position and, therefore, the rocker shaft must be turned to a corresponding position in order to establish a proper connection with said lever.

The driving pin 774 is provided with a flange 775 which flange prevents the driving pin from being placed in back instead of in front of said driving lever; in other words, it prevents any but the proper engagement of these parts.

As has been previously pointed out, the gear sector 764 is of sufficient width to remain in mesh with the actuating gear sector 765 when in either of its two operating positions.

A torsion spring 776 is mounted upon rocker shaft 747 and acts between collar 777 securely fastened thereon and a stop pin 778 projecting from the frame member 743, for returning and yieldingly maintaining the cutter to its open position.

The oscillatory movement of the cutter is limited by providing a stop pin 779 projecting from the frame member 743 for engaging opposite side faces of a cut-away portion 780 of the operating handle hub.

A tape deflecting block 781 is secured upon the upper end of frame member 743 by screws 782 to direct the tape as it passes through the cutter mechanism to the tape moistening device.

*Tape moistening device*

The tape moistening device includes a fluid receptacle 783 (Figure 5) which is removably mounted upon the frame member 743 by providing the frame member with a pair of spaced arms 784 and said receptacle with grooved lugs 785 arranged to rest on the upper edge of the spaced arms. The receptacle is maintained in operative position upon arms 784 by locking pin 786 extending through suitable openings formed in the rear ends of said arms and passing through locking lugs 787 (Figures 2 and 5) extending from the rear face of said receptacle. The locking pin is preferably provided with a right angle bend 788 at one end thereof for engagement with the groove of pin 789 to lock the pin in place. The receptacle is provided with a cover plate 790 preferably formed of a casting and provided with two bearing lugs 791 and 792 one of which may be made removable in order to mount a tape deflecting blade 793 thereon.

The cover is mounted upon the receptacle in any suitable manner so as to be conveniently removable therefrom for servicing. The cover is provided with a water filling hole and with a pivoted cover plate 795 by means of which the filler opening may be closed or opened when fluid is to be added to the receptacle.

The cover 790 is provided with a transverse slot 796 through which projects the bristle end of moistening brush 797. The opposite end of this brush is provided with a backing 798 securely maintained in the lower channeled end of a brush supporting clip 799, the upper end of which clip is secured to the receptacle cover 790 by means of suitable bolts 800 (Figure 5). It will be understood, however, that any other style or type of moistening brush may be mounted in any suitable manner within the receptacle.

The moistening receptacle is mounted adjacent the tape cutting mechanism and the tape is guided from the cutting mechanism by means of the deflecting block 781 to the upper end of the moistening brush by means of an inclined guide surface 801 preferably formed as an integral part of the receptacle cover 790 (Figure 17).

When the tape is to be moistened, the deflecting blade 793 will be located in its tape guiding position as shown in Figure 17 in which position the tape will be guided between this blade and the inclined guide surface 801 to direct the tape to the moistening brush.

In order to resiliently press the gummed surface of the tape against the moistening brush, the deflecting blade 793 is provided with an extending guide plate 802 which plate may be soldered or otherwise secured to the deflecting blade 793. A tension spring 803 is interposed between the receptacle spring pin 804 and pivot pin 805 carried by the free end of crank arm 806 which are securely mounted upon one end of the deflector plate supporting shaft. Spring 803 acts to yieldingly maintain the tape guide blade 793 in position to direct the tape from the tape cutting mechanism to the tape moistening brush as clearly shown in Figure 17 which figure illustrates the normal setting of the guide blade when the moistening device is set to moisten the gummed surface of tape passing therethrough.

The guide plate 793 may be positioned as shown in Figure 15 to direct the tape from the tape cutting mechanism clear of the moistening brush when the gummed surface of the tape is to be left dry. The means for positioning guide blade 793 to pass the gummed tape clear of the moistening brush may include a lever 807 pivotally mounted between the bifurcated end of crank arm 806 by pivot pin 805 and providing this lever with an extension having a cam surface 808 which cooperates with the top surface of the receptacle cover 790 to maintain the guide blade 793 in its deflecting position as shown in Figure 15. When the guide blade 793 is in its deflecting position, its forward end will rest in the recess 809 formed in the tape deflecting block 781. This condition is also shown in Figure 5 and prevents the end of the tape catching upon the forward end of the deflecting blade. Lever 807 when swung to the position shown in Figure 17 acts to limit the pressure of guide plate 802 against the end of the moistening brush 797 and for this purpose the bifurcated end of crank arm 806 is provided with a stop surface 810 cooperating with a contact surface 811 formed on the lever 807. When the stop surface 810 and contact surface 811 are brought into engagement under the influence of spring 803, further rotation of guide plate 802, in the direction of the moistening brush is prevented.

From the above description, it will be appreciated that the moistening device of this invention is extremely simple and may be readily adjusted for moistening tape or for passing tape thereover without moistening merely by the actuation of a single lever 807.

The tape cutting mechanism, as previously pointed out, may be adjusted by the manipulation of handle 766 to automatically cut the printed stamp at the completion of each printing operation or to pass the stamp without cutting. This mechanism in no way conflicts with the adjustment of the moistening device and, therefore, stamps may be cut and moistened or may be cut without moistening or may be left uncut and moistened or left dry at the option of the operator. The adjustment of these devices to accomplish any one of the above conditions is easily and conveniently obtained through the use of cutter control handle 766 and the moistening device control lever 807.

*Automatic disengagement of conveyor system when the tape feeding device is moved into printing position*

Means are provided for automatically disengaging the envelope conveyor system 153 when the tape feeding device 156 is moved into printing position so as to prevent the feeding of envelopes or other mail matter simultaneously with the printing of stamps on tape. This means acts automatically to reestablish the envelope conveyor system drive when the tape feeding device is returned to its non-printing position. For this purpose the stepped driving pulley 244 which is journaled upon the platen roller shaft 326 is provided with a clutch 812 (Figures 12, 13, and 14).

The clutch may include a driving collar 813 keyed to the forward end of the platen roller shaft 326 by means of taper pin 814. The collar on its inboard face is provided with driving lug 815. A clutch ring 816 is pivotally mounted upon the stepped pulley 244 by means of pivot pin 817 and may freely pivot upon pin 817 between the clutch collar 813 and the step pulley 244. The clutch ring 817 is yieldingly urged to swing to an eccentric position with relation to the axis of rotation of the platen shaft 326 by means of spring 818 mounted within a counterbore 819 formed at the adjacent face of step pulley 244 and connected at one end to the step pulley and at its other end to the clutch ring 816 by means of suitable pins. The inwardly extending flange portion 820 of clutch ring 816 is bored as at 821 to provide clearance for the platen shaft 326 and to enable the clutch ring to be swung with relation to said shaft. The bore is provided with a pocket 822 having a clutching shoulder 823 against which the driving lug 815 of clutch collar 813 engages as shown in Figure 13 when the clutch is in driving engagement. The clutch ring 816 is provided with an annular rim 824 against which the clutch actuating plunger 825 may engage to swing the clutch ring about its pivot pin 817 until it is concentric with the axis of the platen shaft 326. In this position the lug 815 of the clutch driving collar 813 will rotate freely within the clutch ring bore 821, thereby disengaging the clutch as shown in Figure 14.

The clutch ring bore 821 is provided with a recess 826 into which recess a centralizing stop pin 827 extends from the side face of the step pulley 244, and this pin is engaged by the inner edge of said recess when the clutch disengaging plunger 825 has shifted the clutch ring 816 into its concentric relation with respect to the axis of the platen shaft 326. In this position as shown in Figure 14, the clutch ring 816 and its attached step pulley 244 will remain stationary while the platen shaft and clutch collar 813 rotate freely with respect thereto.

As soon as the clutch actuating plunger 825 is withdrawn from its engagement with the clutch rim 824, spring 818 will act to swing the clutch ring with relation to the axis of rotation of the platen shaft, thus presenting the clutching shoulder 823 into the path of the lug 815 and thereby reestablishing the driving connection through the clutch as shown in Figure 13.

The clutch actuating plunger 825 is actuated during the operation of the tape positioning device to disconnect the clutch in the manner above described when the positioning device is actuated to place the tape feeding device in printing position and to release the plunger for reestablishing the driving connection through clutch 812 when the positioning device is actuated to move the tape feeding device to its non-printing position.

The clutch actuating plunger 825 is slidably mounted in the machine frame by means of an upper bracket 829 and pivot block 320 (Figures 2 and 4).

As shown in Figure 4, plunger 825 is made in two parts connected in telescopic relation and the two parts being maintained yieldingly in their extended relation by means of an interposed compression spring 830. A collar 831 is fastened to the lower portion of the clutch actuating plunger 825 to engage the upper surface of pivot block 320 to limit the downward movement of the plunger.

The positioning mechanism of the tape feeding device is arranged to raise the plunger when moving the tape feeding device into printing position and to permit the return of the plunger when moving the tape feeding device to its non-printing position and for this purpose the segmental pinion 659 of the tape feeding device positioning mechanism is provided with a plunger engaging roller 832 mounted upon the side face thereof by means of pivot pin 833.

The yielding telescopic portion of the clutch disengaging plunger 825 permits contraction of the plunger during the depression of the platen roller shaft as the tape feeding mechanism is being moved into or out of printing position and follows up the return of the platen to its normally raised operating position to be in position to disengage the clutch in the manner previously described when the tape feeding device is in its printing position.

At this point, we believe it will be well to briefly describe the operation of the positioning mechanism when operated to place the tape feeding device in printing position. To raise the tape feeding device from its non-printing to its printing position, the operator need only swing the positioning handle 656 in a counter-clockwise direction as viewed in Figure 1. This rotation of the handle will, through the segmental gears 659 and 660 rotate positioning shaft 661 in a clockwise direction as viewed in Figures 4 and 5 which are taken looking from the front of the machine toward the rear thereof and in a counter-clockwise direction as viewed in Figures 6, 7, 8, 10 and 11 which are taken looking from the rear toward the front of the machine. Rotation of the positioning shaft 661 will swing the actuating lever 684 to depress the platen and locking pin 695 in the manner previously described and will thereafter, through the slot and pin connection, swing the positioning lever 666 from its angled position as shown in Figures 6 and 10 to its upright position as shown in Figures 7, 8, and 11.

The positioning lever 666 is connected to lever 675 by means of the connecting rod 674 and as these two levers are of the same length, the connecting rod will be maintained horizontal throughout the swinging movement of said levers. During the upward swing of said levers and just as the levers and connecting rod reach the limit of their upward movement, the latch pin 695 will lock the positioning lever 666 by entering its hook portion 697 in the manner previously described and also permits the platen to return to its normal printing position. At the same time, a driving connection is established between the frame member 703 of the tape feeding portion of the device and the driving mechanism of the power plant.

This connection may include providing the inner bearing 704 of frame member 703 with a bearing plate 834 fastened to said inner bearing by means of rivets 835 (Figure 7) and a latching pawl 836 pivotally connected to the frame member 703 by means of pivot pin 837 and provided at its forward end with an off-set head portion 838 spaced from the bearing plate 834 to receive therebetween the driving roller 839 journaled to the upper end of driving lever 840 as by means of pivot pin 841 (Figures 5, 7, and 8). The drive lever 840 is fastened to the forward end of drive shaft 842 as by means of taper pin 843. The drive shaft is journaled in the meter supporting bracket 162 and extends to and is journaled in the rear transmission bracket 164 where it is oscillated from the power plant driving mechanism in a manner to be later described.

As the tape feeding device is moved to printing position in a manner described, the inclined surface 844 formed on the forward end of the latching pawl 836 will engage the driving roller 839 and will ride over this roller until it drops down into driving relation with the roller as shown in the above mentioned figures. A compression spring 845 is interposed between frame member 703 and the top edge of the latching pawl 836 to assist in latching the offset head of the pawl over the driving roller to thereby establish a driving connection between the pawl and driving roller, as the mechanism is raised to printing position.

The final portion of the movement of the tape feeding device into printing position, locks the positioning portion thereof, returns the platen roller to its operative position and establishes the driving connection between the tape cutoff mechanism when this mechanism is set for automatic power actuation.

The lifting of the tape feeding device into printing position also acts to unlatch the swing bracket 354 (Figure 25) of the final sealer roller assembly 310. This is accomplished by the engagement of the latch member 366 by bearing 791 of the tape moistening device and thereby lifting the latch until it is released from its latch plate 369 in the manner shown in Figure 25, whereupon the frame 354 will swing to its broken line position as shown in this figure in manner previously described. As previously pointed out, the lifting of the tape feeding device into printing position also acts to disengage the conveyor system driving clutch 812.

The positioning of the tape feeding device into printing position also unlocks the manual tripping mechanism 846. This operation is accomplished by providing positioning lever 679 with a forwardly extending cam 847, which cam moves into locking relation with a transversely extending pin 848 carried by arm 849 of bell crank lever 850, which bell crank lever is fastened to the clutch tripping shaft 851 (Figures 6 and 6a) by means of taper pin 852. The clutch tripping shaft 851 is journaled in bearing 853 (Figure 2) on meter bracket 162 and bearing 854 on front transmission bracket 163 and has keyed upon its rear end a tripping lever 855 (Figures 2 and 6a), the upper end of which is positioned to engage a trip pin 856 carried by the clutch tripping mechanism floating link 592. As the positioning lever cam 847, when in its retracted position, locks pin 848 of the bell crank 850 against rotation in a counter-clockwise direction as viewed in Figure 6a, it thereby locks the tripping lever 855 to prevent actuation of the meter driving clutch by this mechanism.

During the swing of the positioning levers to raise the tape feeding device to its printing position, the positioning lever cam 847 moves from under the locking pin 848 (Figure 7) thereby releasing the manual tripping mechanism for operation. The remaining portion of the manual tripping mechanism includes a hand tripping lever 857 (Figures 1, 2 and 6a) fastened to the forward end of trip shaft 858 journaled at its forward end in bearing 859 carried by the front frame plate 160 and journaled at its rear end in bearing 860 on the meter supporting bracket 162. A cam lever 861 is fastened to shaft 858 adjacent the forward face of bearing 860 and is adapted to engage rocker lever 862 in the manner shown in Figures 6a, 5 and 7. The rocker shaft is journaled upon the forward face of the meter bracket 162 to pivot pin 863 and its end opposite that engaged by cam lever 861 engages the upper end of push rod 864, which push rod is slidably supported in a pair of brackets 865 carried by the meter supporting bracket 162 (Figure 5). The push rod 864 is yieldingly maintained in contact with rocker lever 862 by mounting a compression spring 866 between the lower bracket 865 and a collar 867 fastened to the push rod in the manner shown in Figure 6a. The lower end of push rod 864 engages arm 868 of bell crank lever 850. This completes the description of the train of mechanism from the manual tripping lever 857 to the floating link 592 of the clutch tripping mechanism.

When the tape printing device is in printing position and the manual tripping mechanism is set in the manner just described, the operator may place the meter clutch in operation to print a stamp of selected value upon a length of tape. To manually place the meter clutch in operation for printing a stamp, the operator need only depress the manual tripping lever 857, which, through the train of mechanism just described, will swing the tripping lever 855 in a counter-clockwise direction as viewed in Figure 6a to in turn apply longitudinal movement to the floating link 592 of the clutch tripping mechanism to render the meter driving clutch active in the manner previously described.

Means are provided for preventing the manual tripping mechanism from being actuated by the operator during the raising of the tape feeding device from its non-printing to its printing position and vice versa.

This means includes providing the trip shaft 858 (Figure 10) with an upstanding arm 869 and securely fastening the arm to said shaft by means of taper pin 870. The upper end of arm 869 is provided with an L shaped notch 871 into which a locking block 872 carried by the platen depressing finger 701 enters during the depression of the platen roller. These parts are so arranged as to enter the locking block 872 into the L shaped notch 871 of arm 869 simultaneously with the depression of the platen roller and just prior to the release of locking pin 848 by the positioning lever cam 847. The locking block 872 is raised until it just clears the shorter finger of arm 869 as shown in Figure 4 when the tape feeding device is finally locked in printing position, thereby releasing the manual tripping mechanism.

Due to this interlocking arrangement just described, it is impossible to place the meter in operation by the manual tripping mechanism during the shifting of the tape feeding device from its non-printing to its printing position and vice versa.

The operation of the tape feeding device during a printing cycle will now be described.

The meter driving clutch may be placed in operation by actuating the manual tripping lever 857 (Figure 1) to effect driving of the main shaft of the power plant through one complete cycle of operation during which cycle the tape feeding device will actuate in cooperation with the printing drum of the meter to print a stamp of selected value. At the end of this cycle of operation, the meter driving clutch will automatically disengage in the manner previously described. This mechanism can be actuated only once for each operating cycle of the machine irrespective of how long the manual tripping lever is maintained in its depressed position and independent of the number of times this lever may be depressed during a printing cycle of operation. This safeguards the machine against waste of postage and insures that each printing cycle will be complete, definite and that the machine will automatically stop upon the completion of each printing operation. It further requires the manual tripping lever to be released before the said tripping lever may be actuated to start the machine upon a second cycle of operation.

With the placing of the meter clutch in operation, the main drive shaft will start upon its cycle of rotation and, through its connection with the meter 157, will rotate the meter printing drum 332. At the same time the tape feeding frame member 703 is shuttled from its normal rest position as shown in Figure 5 to that in Figure 8 in which latter figure the discharge end of the tape guide chute 113 is moved to the left in order to position the end of the tape slightly in advance of the point of contact between the printing portion of drum 332 and the platen roll 327 at the start of the printing operation, whereby the impression will be printed slightly to the rear of the cut end of the tape.

The tape is yieldingly forced into contact with the printing surface of the drum to insure the printing of a perfect impression thereon. Through this yielding engagement, the tape will be gripped between the printing surface of the drum and the platen roller and thereby drawn through the tape guide chute 713 and at the same time the frame member 703 of the tape feeding device will be shuttled to the right, as viewed in Figure 8, to its original position as shown in Figure 15. In this figure the tape is shown extending from the tape guide chute 713 and feeding through the tape cutting mechanism during the printing operation, whereas in Figure 17, the printing operation has been completed and the printed portion of tape has been automatically severed from the main portion of said tape. This Figure 17 represents the end of the tape feeding and ejecting cycle and the parts are shown as they would appear prior to the return of the printing drum to its rest position.

The means for shuttling the tape feeding frame member 703 may include mounting upon shaft 522 (Figure 3) as by means of taper pin 873, a retracting cam 874 and a return cam 875. These two cams may be integrally formed. A cam lever 876 (Figures 2 and 3) is pivotally mounted upon the rear transmission bracket 164 by pin 877. The lever is provided with a downwardly extending arm 878 having journaled on its free end a cam roller 879 for operatively engaging the retracting cam 874. The lever is also provided with an upwardly extending arm 880 having journaled upon the free end thereof a cam roller 881 for cooperating with the return cam 875. The retracting and returning cams cooperate to impart a positive oscillatory motion to the cam lever 876. The cam lever 876 is provided with an outwardly extending arm 882, to the free end of which is secured by means of pivot pin 883, a block 884. A connecting rod 885 is securely fastened at its upper end to block 884 by means of nuts 886 and at its lower end is screw threaded into bearing block 887 which block in turn is connected to lever 888 by means of pivot pin 889. The lever 888 is fastened on drive shaft 842, adjacent the rear end thereof by means of taper pin 890.

Figure 3:
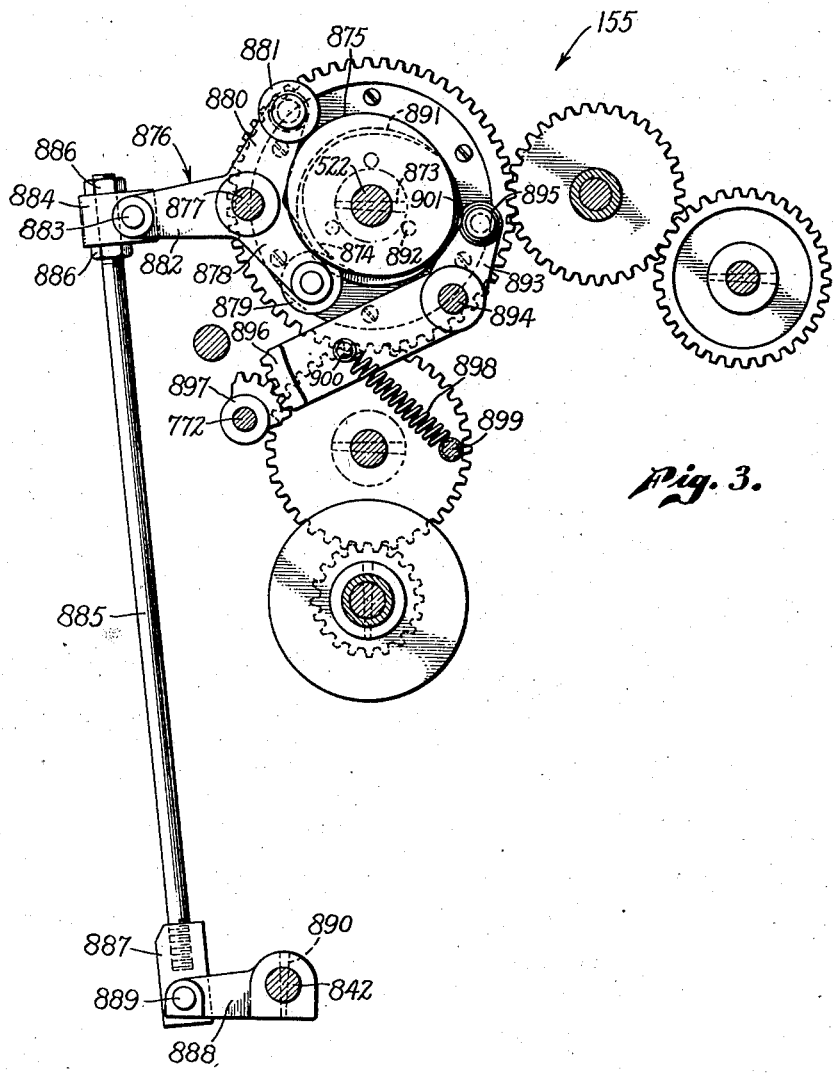
Figure 3 is a fragmental sectional view taken substantially along the line 3—3 of Figure 2 to show the driving mechanism for the tape feeding device and also the driving mechanism for actuating the tape cutter.

The shuttling mechanism just described operates to shuttle the tape feed frame member 703 during the initial rotation of shaft 522 during which initial rotation the high portion of retracting cam 874 will engage cam roller 878 swinging the cam lever in a clockwise direction as viewed in Figure 3 and during this rotation the cam roller 881 will travel down from the high to the low portion of return cam 875. The clockwise rotation of cam lever 876 is transmitted through connecting rod 885 and lever 888 to operate the drive shaft 842 which operation of said drive shaft will, through the driving lever 840, move the frame member 703 of the tape feeding device to its retracted position for locating the stamp near the leading end of the gummed tape, as described above. Upon starting the printing operation, continued rotation of shaft 522 and cams 874 and 875 will cause the cam lever 876 to rotate in a counter-clockwise direction, which rotation through the mechanism above described, will return the frame member 703 to its normal position.

The return of the frame member 703 (Figure 8) with its attached tape guiding chute 713 is timed to be slightly slower than the rate of withdrawal of the tape through said chute during the printing operation. This causes the tape to be pulled through the chute as the frame member 703 is returned to its rest position, thus maintaining the tape in tension and thereby presenting a smooth surface without wrinkles to the printing face of the drum.

The driving mechanism for automatically operating the tape cutoff device may include providing the main drive shaft 522 with a cutoff cam 891 (Figure 3) preferably secured to the inner face of retracting cam 874 by rivets 892 and by providing a cam lever 893 pivotally mounted upon pin 894 carried by the rear transmission bracket 164 and having a cam roller 895 cooperating with said cutoff cam 891. The cam lever 893 is provided with a gear segment 896 engaging a segmental pinion 897 fastened to the rear end of driving shaft 772 (Figures 2, 3, and 16). As previously pointed out in connection with the description of the tape cutting device, the forward end of shaft 772 is provided with a driving lever 771 to which the operating crank 770 of the tape cutoff mechanism may be connected when automatic operation of the tape cutting device is to be employed.

A tension spring 898 (Figure 3) is interposed between spring pin 899 extending from the inner face of the rear transmission bracket 164 and spring pin 900 extending from the side face of the segmental gear portion 896 of cam lever 893. The spring acts to maintain cam roller 895 in engagement with the cutoff cam 891. The cutoff cam 891 is provided with actuating lobe 901 which engages the cam roller 895 at the end of the operating cycle of the machine to actuate the cutter to cut off the printed tape and remains in this position during the rest period of the machine. This condition is shown in Figure 3.

During the initial portion of the operating cycle, the cam gradually decreases in eccentricity until the cutter has moved to its full open position as shown in Figure 15 and from this point the eccentricity of the cam gradually increases thereby slowly rotating the tape cutoff blade 754 closing the opening between the cutting edge of the blade and the shearing edge of the fixed cutter blade until just prior to the completion of the operating cycle of the machine at which point the lobe portion of the cam engages and turns under cam roller 895 thus giving the cutter blade a quick movement to complete the shearing of the tape (Figure 17).

As was pointed out during the description of the tape cutting and moistening device, the stamps printed on the tape may be cut off at the end of each operating cycle and moistened during their passage through the device or may be directed over the moistening brush so that the stamps will remain dry and further, the tape may be left uncut so that a number of stamps may be printed upon a single strip of tape.

After the desired number of stamps have been printed on tape, the tape feeding device may be returned to its non-printing position. The return of the tape feeding device to its non-printing position will, in the manner previously described, first unlock the positioning mechanism, depress the platen roller and simultaneously therewith lock the manual tripping mechanism.

lower the tape feeding, cutting and moistening devices to their retracted positions, unlatch and disconnect the driving connection formed between the frame member 703 and driving lever 840 and simultaneously with the completion of the retracting operation the positioning lever locking cam 874 will swing under in locking relation with respect to the manual tripping mechanism locking pin 848. The driving mechanism, for the tape cutting device, will also be disconnected during the return of the tape feeding mechanism to its non-printing position.

In order to disconnect the offset head end 838 of latch pawl 836 from its driving engagement with the driving roller 839 mounted upon the upper end of drive lever 840, the bell crank lever 692 is provided with a contact surface 902, which, during the initial portion of the return movement of the positioning device actuating lever 684 will engage the offset head 838 of the latching lever and thereby lifting this lever (Figure 11) until its offset head portion thereof will ride over upper curved surface of the driving roller 839.

It is desirable to provide a compression spring 903 (Figure 6) interposed between bracket 904 fastened to the right hand end of connecting rod 674 as viewed in Figure 6 and a lug 905 extending from the side portion of the frame member 703. In order to prevent spring 903 from buckling, a guide rod 906 is fastened to bracket 904 and slidably extends through said spring 903 and also through lug 905. This compression spring 903 serves to maintain the frame member 703 in position to be coupled to the actuating lever 840 when the tape feeding device is moved into its printing position. In order to properly locate the frame member 703 for coupling the positioning lever 679, it is provided with a stop surface 907 (Figure 10) which engages a stop plate 908 carried by rear bearing 705 of frame member 703.

To limit the swing of the positioning mechanism when lowering the tape feeding device to its non-printing position, the positioning lever 679 is provided with an offset shoulder 909 (Figures 6 and 7) for engaging an adjustable stop screw 910 when the tape feeding device has reached its fully retracted position. The stop screw 910 is threaded into the frame base 159 and locked into its adjusted position by means of lock nut 911.

The tape feeding mechanism is provided with safety devices to prevent the operation of the machine and thereby the possible wastage of postage unless the tape is correctly positioned within the tape guide chute 713 and unless sufficient tape is contained within the chute to more than complete the printing of a stamp.

The first of these two safety devices 911 may include a detecting finger 912 slidably supported upon the rear side rail 914 adjacent the discharge end of the horizontal portion 718 of the tape guide chute 713 by a headed pin 913 which extends through a suitable slot formed in the end portion of this finger.

The tape guide chute adjacent the feeler end 915 of the finger is provided with an opening 916 through which the end 915 will project when the tape does not extend past this portion of the chute as shown in Figure 20. However, when the tape extends beyond this portion of the guide chute, it covers opening 916 thus preventing the end 915 of the finger from entering into said opening. In this way unless the tape is in correct position to start the printing of a stamp, the detecting finger will actuate and through means to be described, will lock the machine against operation.

For this purpose the lower end of detecting finger is connected to lug 917 formed adjacent the upper end of stop lever 918 as by pivot pin 919. The stop lever 918 is mounted upon frame member 703 by pivot pin 920. A compression spring 921 is interposed between frame 703 and stop lever 918. The purpose of spring 921 is to yieldingly urge the detecting finger 912 into the opening 916 formed in the guide chute. When the tape does not extend across the opening 916, spring 921 will move the detecting finger 912 and stop lever 918 to their respective positions as shown in Fig. 20. However, when the tape covers the opening the detecting finger 912 and stop lever 918 will be in their respective positions as shown in Figures 18 and 22. The manner in which stop lever 918 functions to prevent operation of the machine will be described presently.

The second portion 922 of the safety device may include a bellcrank lever 923 pivoted to frame member 703 by means of pivot pin 920 which is the same pivot pin supporting the stop lever 918. The bellcrank lever 923 is provided with an arm 924 having an offset end 925 which cooperates with an anvil block 926 having a groove 927 into which the offset end 925 of the bellcrank lever is yieldingly urged as shown in Figure 22 by means of a spring similar to spring 921, which spring is directly in back of spring 921 and, therefore, cannot be seen in the drawings and said spring interposed between the frame 703 and the bellcrank lever stop arm 928. The offset end 925 of bellcrank lever 923 will enter the anvil groove 927 when the tape does not extend through this portion of the tape chute 713. For this purpose, at this locality, the top and bottom plates of the guide chute are slotted. The anvil block 926 is positioned sufficiently remote from the discharge end of the tape guide chute 713 to insure a sufficient supply of tape being contained within the guide chute for the printing of at least one complete stamp, and this portion of the safety device will function to lock the machine against operation in those cases where there is an insufficient length of tape remaining in the chute for the printing of one complete stamp. This condition is shown in Figure 22 wherein the offset end 925 of bellcrank 923 has swung into the anvil groove 927 and its stop arm 928 has swung into locking position. The stop arm 928 of bellcrank lever 923 corresponds to the position of stop lever 918 as shown in Figure 20.

The mechanism by which these two safety devices function to prevent operation of the machine includes a control lever 929 securely fastened to the forward end of control shaft 930 which shaft is journaled in bearing 931 on frame member 703 (Figure 18) and has fastened to its rear end a cam lever 932. A torsion spring 933 is mounted upon shaft 930 between the end of bearing 931 and cam lever 932 and acts between these two members to yieldingly maintain stop lever 929 against stop pin 934. As may be observed in Figure 18, the push rod 864 is provided with a collar 935 keyed thereto by means of pin 936, against the under surface of which the free end of cam lever 932 is positioned to be engaged when the push rod 864 is depressed.

The control lever 929 at its free end is provided with two outwardly projecting spaced lugs, namely a short lug 937 and a longer lug 938 providing an open space 939 therebetween into which space the free ends of stop lever 918 and stop arm 928 are positioned when the tape is properly positioned and contained within the tape guide chute 713 as shown in Figures 18 and 21. The positioning of the two safety devices as just described, will permit the machine to be placed in operation by means of the manual tripping lever 857 which in the manner described depresses the push rod 864 for actuating the meter clutch tripping mechanism. During the downward movement of push rod 864, collar 935 will engage the free end of cam lever 932, rotating said cam lever in a clockwise direction as viewed in Figure 18 and through its connection with control lever 929, will likewise rotate this lever in a clockwise direction. This condition is clearly shown in Figure 18, whereupon the control lever will swing freely past the ends of stop lever 918 and stop arm 928 thus permitting the machine to be placed in operation with the assurance that a full and complete stamp will be printed during the operating cycle of the machine.

The first safety device 911 will function to lock the machine against operation when the tape does not extend across opening 916 to prevent the movement detector finger 912 therein. This condition is illustrated in Figure 20 and as the tape is not in position to prevent the entry of detecting finger into opening 916, the compression spring 921 will act to advance the detecting finger and as a result the stop lever 918 will swing until its abutting end overlies the long stop lug 938 of control lever 929. This will prevent rotation of the control lever in a clockwise direction as viewed in this figure and as a result will lock the manual tripping mechanism so that it cannot be actuated to place the meter driving clutch in operation. This condition can be corrected only by advancing the tape until it again covers the detecting finger slot 916, thereby returning stop lever 918 to its normal position as shown in Figure 18 whereupon the manual tripping mechanism may be operated in the manner described.

The second safety device acts to prevent operation of the machine when an insufficient length of tape remains within the tape guide chute 713. Figure 22 illustrates the manner in which the second safety device will operate to lock the machine against operation. In this figure, it may be observed that the end of the tape no longer extends across the anvil block groove 927 to prevent the entrance of the offset end 925 of the second safety device bellcrank lever 923 therein, and as a result the bellcrank lever will rotate in a counterclockwise direction as viewed in Figure 22, thereby swinging the abutting end of its stop arm 928 over the long stop lug 938 of control lever 929 and as a result locking the control lever 929 against rotation. Thus it will be seen that the locking of control lever 929 will prevent the machine from being manually placed in operation unless there is sufficient tape contained within the tape guide chute 713 to more than print a complete stamp.

The front plate 160 is provided with a relatively large opening 940 (Figures 1, 18 and 19) to permit access to the tape magazine 730 for replenishing the supply of tape therein. The front plate opening 940 is provided with a door 941 having hinge brackets 942 hinged to the front plate 160 by means of hinge pins 943 and a hand knob 945 fastened adjacent the upper edge of the door by means of screw 946 extending through the door from the rear side thereof and screw threaded into said knob. A grooved latch bushing 947 is mounted upon screw 946 between the head portion thereof and the rear face of the door. A latch pin 948 is slidably mounted within a suitable bore 949 formed in the frame plate 160. The latch pin is provided with a rounded point for yieldingly engaging the groove formed in the latch bushing 947 and at its opposite end is provided with a head 950 for seating in the bottom of the counterbored portion of latch pin bore 949 when the door is swung open. A compression spring 951 is provided to act between the head portion of latch pin and screw plug 952 screw threaded into the upper end of the counterbored portion of the pin bore. This structure provides a spring latch for yieldingly maintaining the door 941 in its closed position. The door is opened to enable a fresh roll of tape to be mounted within the tape magazine in the manner previously described.

To facilitate threading of the new tape into guide chute 713, means are provided for automatically retracting the two safety devices 911 and 922 when the door 941 is opened and at the same time to lock the manual tripping mechanism so that the machine cannot be operated with a possible wastage of postage when the door is open. This automatic means includes a push rod 953 (Figures 2, 18, and 19) slidably extending through front plate bearing 954 and meter supporting bracket bearing 955. The push rod may be offset at 956 as shown in Figures 18 and 19 to clear the tape magazine and other parts of the machine. The forward end of push rod abuts against the rear face of door 941 so that when the door is closed, the end of the rod will be maintained in its retracted position (Figure 18), and when the door is opened to project forwardly as shown in Figure 19. The rear end of push rod 953 engages a horizontally extending arm 957 projecting from the lower end of shaft 958 which shaft is journaled in brackets 959 and 960 securely fastened to the rear face of meter bracket 162 as by means of screws 961 (Figures 5, 18, and 19). To maintain shaft 958 in vertical alignment in bearings 959 and 960, a cotter pin 962 extends through the shaft just above bearing 959 and a thrust washer 963 is interposed between the cotter pin and upper surface of the bearing. The upper end of shaft 958 is provided with a horizontally extending arm 964 which when the door 941 is in its closed position as shown in Figure 18, extends in front of the stop lever 918 and stop arm 928 of the two safety devices 911 and 922. As will be noted in this figure, sufficient space is left between the stop levers and shaft arm 964 to permit the stop levers to function in the manner previously described. However, when the door is open as shown in Figure 19, the shaft arm 964 will engage and swing the stop lever 918 and stop arm 928 rearwardly. This action will position stop arm 928 directly above the short lug 937 of control lever 929, thereby locking the control lever against clockwise rotation as viewed in this figure and in this way, as previously described, will lock the manual tripping lever so that the machine cannot be placed in operation. Swinging of the control lever 918 and control arm 928 rearwardly serves to withdraw the feeler finger 912 of the first safety device clear of the path of travel of the tape through the horizontal portion 718 of the tape guide chute 713 and to lift the offset portion 925 of bellcrank lever 932 of the second safety device 922 clear of the anvil and its groove 927. The retraction of the two safety devices is for the purpose of facilitating threading of the tape into the tape guide chute 713 in the manner previously described.

A tension spring 965 (Figures 5, 18, and 19) is interposed between the horizontal arm 957 and meter bracket 162. As arm 957 is relatively close to the rear face of bracket 162, it is preferable to extend the tension spring through a suitable opening formed through this bracket and to secure the inner end of spring 965 to the forward face of this bracket by means of spring pin 966. The tension spring 965 yieldingly acts to maintain arm 957 in engagement with the rear end of push rod 953. When the door is opened to release the push rod 953 the tension spring will act to retract the two safety devices in the manner described. The return of the door to its closed position will act to positively rotate shaft 958 and to thereby return the shaft arm 964 to its inoperative position as shown in Figure 18. The operation of the safety devices upon opening or closing of the door is simple and effective and not only prevents accidental operation of the machine which may cause a waste of postage, but also facilitates threading of the tape into the tape guide chute 713. This constitutes one of the important features of the machine.

It will be understood that the tape feeding device need be only threaded when a new roll of tape is mounted therein and that it may be moved freely from its non-printing to its printing positions and vice versa without disturbing the position of the tape within guide chute 713.

It is desirable to lock the meter 157 in its operative position upon the frame of the machine when the tape feeding device 156 is moved to its printing position and to release this meter lock when the tape feeding device is returned to its non-printing position. This locking mechanism is for the purpose of preventing possible damage to the delicate parts of the tape feeding device, should it be attempted to remove the meter while the tape feeding device is in its printing position.

The meter positioning lock may include slidably mounting a lock bar 967 through a suitable bearing 968 formed in frame base 159 and bearing 969 carried by the meter supporting plate 970. As shown in Figures 2 and 24, the lock bar 967 is provided with a collar 971 keyed thereto by cotter pin 972. A tension spring 973 is interposed between the head of cotter pin 972 and a spring plate 974 which spring plate is suitably fastened to the rear face of the meter bracket 162 by suitable screw means 975. The tension spring normally acts to yieldingly urge lock bar upwardly into its meter locking position as shown in Figure 24. This is the position which the lock bar would assume when the tape feeding device is in printing position, and in this figure it may be observed that the upper end of lock bar 967 is of a smaller diameter to pass through bearing 969 and to provide a shoulder 976 to engage the lower end of bearing 969 to thereby limit the upward movement of said bar under the influence of its spring 973. The upper end portion of said lock bar 967 extends into bushing 978 mounted in the base portion of the meter 157 thereby locking said meter in its operative position.

During the rotation of positioning shaft 661 to return the tape feeding device to its non-printing position, the head of retaining collar set screw 665 will engage the upper surface of the locking bar collar 971 and through this engagement will depress the lock bar until its end portion 976 is fully withdrawn from the meter bushing 978 as illustrated in Figure 2. Thus the meter is now released and may be removed from the power plant without liability of injury to the tape feeding device.

As many possible embodiments may be made of the above invention and as many changes might be made in the embodiment above set forth, it is to be understood that all matter hereinbefore set forth or shown in the accompanying drawings is to be interpreted as illustrative and not in a limiting sense.

We claim:

1. In a mail treating machine having a driving mechanism; a tape feeding device including tape guiding means, means mounting said device for movement bodily to or from its operative position, means for moving said device to or from its operative position, and means operable upon the movement of said device to its operative position for operatively connecting said device with the driving mechanism of the machine and upon return of said device to its inoperative position for automatically disconnecting said driving connection.

2. In a mail treating machine having a rotary printing drum, a cooperating yieldable platen roller, and a retractable tape feeding device including a tape guide; means for bodily moving the tape feeding device and guide between operative and inoperative positions, and means operable by said placing means for retracting the platen roller during the movement of the tape feeding device to or from its operative position.

3. In a mail treating machine, in combination a retractable tape feeding device; a locking means operative for securely locking the tape feeding device when said device is moved to its operative position, means for moving the tape feeding device to or from its operative position, and means operable by said positioning means for releasing said locking means prior to the movement of said device to its inoperative position.

4. In a mail treating machine having a pair of opposed final sealing rollers at least one of which is retractable and a retractable tape feeding device including a tape guide; means for placing the tape feeding device in operative position, and means operable by said placing means for causing said one roller roller to be retracted.

5. Apparatus of the character described, in combination, a rotatable platen, a rotatable printing drum adjacent said platen and adapted to print on mail matter passed therebetween, means for operating said printing drum, a control mechanism manually actuatable for placing said drum operating means in operation, a tape feeding device mounted in said apparatus for movement into an operative position relative to said platen and printing drum and into an inoperative position remote from said platen and printing drum, manually operable means for placing said tape feeding device in operative or inoperative position, and means operable by said placing means for automatically rendering said manually actuatable control mechanism operable when said tape feeding device is moved to its operative position and for automatically rendering said control mechanism inoperable when said device is returned to its inoperative position.

6. Apparatus according to claim 5 wherein the means operated by the tape feeding device positioning means comprises an arm connected to and operated by the tape device positioning means which is moved out of the path of movement of the manually actuatable control mechanism when the tape device is moved into its operative position, and which is moved into the path of movement of the tape device positioning means when the tape device is moved into its inoperative position whereby the manually actuatable control mechanism is locked against operation when the tape device is in its inoperative position.

7. In a mail treating machine, in combination, a rotary printing drum, a rotatable platen juxtaposed to said printing drum, a frame in which said platen is rotatably mounted, means mounting said frame in pivotable relation to said printing drum whereby said platen is movable toward and away therefrom, a tape feeding device movable between operative and inoperative positions relative to said platen, means for moving said tape feeding device into and out of its operative and inoperative positions, and means associated with said tape device moving means and with said frame for pivoting said frame to move said platen away from said drum during the movement of the tape device from its operative or inoperative positions.

8. In a mail treating machine, in combination, a rotatable printing head, a cooperating rotatable platen, means for rotating said printing head and platen, means for supporting and guiding a tape between said head and platen, means mounting said tape supporting and guiding means for movement between operative and inoperative positions respectively adjacent to and remote from said head and platen, and means for moving said supporting and guiding means between said positions.

9. In a mail treating machine, in combination, a rotatable printing head, a cooperating rotatable platen, means for rotating said printing head and platen, means for supporting and guiding a tape between said head and platen, means mounting said tape supporting and guiding means for movement between operative and inoperative positions respectively adjacent to and remote from said head and platen, and means including a unitary manual control member for moving said supporting and guiding means between said positions.

10. In a mail treating machine, in combination, a rotatable printing head, a cooperating rotatable platen, tape supporting means including a chute for supporting and guiding a tape between said head and platen, means mounting said tape supporting and guiding means for movement between operative and inoperative positions respectively adjacent to and remote from said head and platen, and means for moving said supporting and guiding means between said positions.

11. In a mail treating machine, in combination, a rotatable printing head, a cooperating rotatable platen, tape supporting means including a chute for supporting and guiding a tape between said head and platen, means mounting said tape supporting and guiding means for movement between operative and inoperative positions respectively adjacent to and remote from said head and platen, and means for moving said supporting and guiding means between said positions, said chute including a substantially horizontal portion extending on opposite sides of the vertical center line of said platen.

12. In a mail treating machine, in combination, a rotatable printing member, a cooperating rotatable platen, means for rotating said printing head and platen, a tape supporting structure for supporting tape near said head and platen, means mounting said structure for movement around said platen between operative and inoperative positions relative thereto, and means for moving said tape supporting structure between said positions.

13. In a mail treating machine, in combination, a rotatable printing member, a cooperating rotatable platen, means for rotating said printing head and platen, a tape supporting structure for supporting tape near said head and platen, means mounting said structure for movement around said platen between operative and inoperative positions relative thereto, and means for moving said tape supporting structure between said positions, said tape supporting structure including a chute having entrance and exit ends connected by a curved portion, the exit end of said chute lying beyond the nip between said platen and head in the direction of tape movement when said tape supporting structure is in operative position and lying behind said nip when said supporting structure is in its inoperative position.

14. Apparatus according to claim 12 wherein said tape supporting structure includes a tape chute mounted on a carriage and said mounting means includes a pivot about which said tape supporting structure has movement during its movement between operative and inoperative positions whereby the exit end of said chute is moved out of the path of mail matter between said head and platen when said supporting structure is placed in its inoperative position.

15. In a mail treating machine, in combination, a rotatable printing head, a cooperating rotatable platen, means for rotating said printing head and platen, means for supporting and guiding a tape between said head and platen, means mounting said tape supporting and guiding means for movement between operative and inoperative positions respectively adjacent to and remote from said head and platen, a tape shearing device, means mounting said tape shearing device for movement between operative and inoperative positions respectively adjacent to and remote from said head and platen, and means for simultaneously moving said supporting and guiding means and said tape shearing device between their said positions.

16. In a mail treating machine, in combination, a rotatable printing head, a cooperating rotatable platen, means for rotating said printing head and platen, means for supporting and guiding a tape between said head and platen, means mounting said tape supporting and guiding means for movement between operative and inoperative positions respectively adjacent to and remote from said head and platen, a tape shearing device operatively associated with said supporting and guiding means and movable between operative and inoperative positions respectively adjacent to and remote from said head and platen, and means for simultaneously moving said supporting and guiding means and said shearing device between said positions.

17. In a mail treating machine, in combination, a rotatable printing head, a cooperating rotatable platen, means for supporting and guiding a tape between said head and platen, means mounting said tape supporting and guiding means for movement between operative and inoperative positions respectively adjacent to and remote from said head and platen, a tape moistening device, means mounting said tape moistening device for movement between operative and inoperative positions relative to said head and platen, and means for simultaneously moving said supporting and guiding means toward its operative position and said tape moistening device toward its operative position.

18. In a mail treating machine, in combination, a rotatable printing head, a cooperating rotatable platen, means for supporting and guiding a tape between said head and platen, means mounting said tape supporting and guiding means for movement between operative and inoperative positions respectively adjacent to and remote from said head and platen, a tape moistening device, means mounting said tape moistening device for movement between operative and inoperative positions relative to said head and platen, and means for moving said supporting and guiding means and said tape moistening device into operative position.

19. Apparatus according to claim 18 wherein said tape supporting and guiding means includes a tape chute having an exit end, the exit end of said chute and said moistening device being disposed on opposite sides of said platen when said supporting and guiding means and said tape moistening device are in their inoperative positions.

20. Apparatus according to claim 18 wherein said tape supporting and guiding means includes a tape chute having an exit end, the exit end of said chute and said moistening device being disposed on opposite sides of said platen when said supporting and guiding means and said tape moistening device are in their inoperative positions, and wherein said exit end and the moisture applying portion of said tape moistening device are on one side of the uppermost surface of said platen when said supporting and guiding means and said tape moistening device are in their operative positions.

21. Apparatus according to claim 18 wherein said tape supporting and guiding means includes a tape chute having an exit end, the exit end of said chute and said moistening device being disposed on opposite sides of said platen and below the uppermost surface thereof when said supporting and guiding means and said tape moistening device are in their inoperative positions.

22. In a mail treating machine, in combination, a rotatable printing head, a cooperating rotatable platen, means for rotating said printing head and platen, a tape feeding device adapted to be placed in operative or inoperative condition to feed tape to said head and platen, a tape shearing device, means mounting said tape shearing device for movement between operative and inoperative positions relative to said head and platen, and single operating means for simultaneously placing said tape feeding device in operative condition and for moving said tape shearing device into operative position.

23. In a mail treating machine, in combination, a rotatable printing head, a cooperating rotatable platen, means for rotating said printing head and platen, a tape feeding device adapted to be placed in operative or inoperative condition, a tape moistening device, means mounting said tape moistening device for movement between operative and inoperative positions relative to said head and platen, and single operating means for simultaneously placing said tape feeding device in operative condition and for moving said tape moistening device into operative condition.

24. In a mail treating machine, in combination, a rotatable printing head, a cooperating rotatable platen, means for rotating said printing head and platen, a tape feeding device adapted to be placed in operative or inoperative condition, a tape shearing device, means mounting said tape shearing device for movement between operative and inoperative positions relative to said head and platen, a tape moistening device, means mounting said tape moistening device for movement between operative and inoperative positions relative to said head and platen, and single operating means for simultaneously placing said tape feeding device in operative condition and for placing said tape shearing and moistening devices in operative position.

25. A printing machine comprising, in combination, a rotatable printing head, a cooperating rotatable platen, means for rotating said printing head and platen, means for supporting and feeding a tape supporting means into and out of operative relation with said printing head and platen, a tape moistening device, means pivotally mounting said tape moistening device for pivotal movement into and out of operative relationship with said printing head and platen so that when in operative position said moistening device may receive printed tape from between said printing head and platen, and control means connected to said tape supporting means and to said moistening device for moving said tape supporting means and said tape moistening means into and out of operative position.

26. In a device for printing and feeding tape between a rotary platen and a cooperating rotary printing head adapted to engage and feed a tape to be printed on therebetween, the combination of, means for feeding a tape to said printing head and platen comprising a curved tape chute for guiding tape through and beyond the nip of the printing head and platen, means supporting said tape chute for rocking movement about a horizontal axis from operative position between said printing head and platen to inoperative position substantially spaced from said printing head.

27. A printing machine comprising in combination, a rotatable printing head, a cooperating rotatable platen, means for rotating said printing head and platen, means for guiding an object to be printed upon between said printing head and platen, means for engaging and discharging objects after passage thereof between said printing head and platen, means for supporting and feeding a tape between said printing head and platen, means for moving said discharge means from an operative position adjacent said platen and printing head into an inoperative position displaced therefrom, and means for moving said tape-supporting means into and out of operative relation with said printing head and platen.

28. Apparatus as described in claim 27, including a single control means, and means responsive to movement of said control means for simultaneously moving said tape supporting mechanism into operative position, and moving said discharge means into inoperative position.

29. Apparatus as described in claim 27, in which said guide means for said objects includes interlock means for normally preventing operation of said machine, and means responsive to feeding of an object to said platen and printing head for disabling said interlock means, and additional means responsive to movement of said tape-supporting means into operative position for disabling said interlock means.

30. A printing machine comprising, in combination, a printing head and a printing platen adapted to print upon and feed an object entered therebetween, a discharging means for receiving an object from said printing head and platen, said discharging means being movable between operative and inoperative positions, a tape supporting and feeding mechanism movable between inoperative and operative positions, a control member movable between two positions, and means responsive thereto for simultaneously shifting said tape supporting means from inoperative to operative positions and said discharge means from operative to inoperative positions, respectively, said means including a mechanism interconnecting said control member and said tape supporting mechanism operable in all positions to transmit motion from said control member to said tape supporting mechanism, but incapable of transmitting motion from said tape supporting mechanism to said control member in the operative position of said tape supporting means.

31. In a mail treating machine, in combination, a rotatable printing head, a cooperating rotatable platen, means for rotating said printing head and platen, means for guiding an object to be printed upon between said printing head and platen, means including a roller for engaging and discharging objects after passage thereof between said printing head and platen, means mounting said roller for movement into and out of discharging position in relation to the path of travel of said object, a tape feeding device adapted to be placed in operative or inoperative condition, and means for placing said tape device in operative condition and for effecting movement of said roller out of its discharging position.

32. In a mail treating machine, in combination, a rotatable printing head, a cooperating rotatable platen, means for rotating said printing head and platen, means for guiding an object to be printed upon between said printing head and platen, means including a roller for engaging and discharging objects after passage thereof between said printing head and platen, means mounting said roller for movement into and out of discharging position in relation to the path of travel of said object, a tape feeding device adapted to be placed in operative or inoperative condition, and means for simultaneously placing said tape device in operative condition and for effecting movement of said roller out of its discharging position.

33. In a mail treating machine, in combination, a rotatable printing head, a cooperating rotatable platen, means for rotating said printing head and platen, means for guiding an object to be printed upon between said printing head and platen, means including a roller for engaging and discharging objects after passage thereof between said printing head and platen, means mounting said roller for movement into and out of discharging position in relation to the path of travel of said object, a tape feeding device adapted to be placed in operative or inoperative condition, a tape shearing device, means mounting said tape shearing device for movement between operative and inoperative positions relative to said head and platen, and operating means for placing said tape feeding device in operative condition for placing said tape shearing device in operative position and effecting movement of said roller out of its discharging position.

34. In a mail treating machine, in combination, a rotatable printing head, a cooperating rotatable platen, means for rotating said printing head and platen, means for guiding an object to be printed upon between said printing head and platen, means including a roller for engaging and discharging objects after passage thereof between said printing head and platen, means mounting said roller for movement into and out of discharging position in relation to the path of travel of said object, a tape feeding device adapted to be placed in operative or inoperative condition, a tape moistening device, means mounting said tape moistening device for movement between operative and inoperative positions relative to said head and platen, and operating means for placing said tape feeding device in operative condition, for placing said tape moistening device in operative position, and for effecting movement of said roller out of its discharging position.

35. In a mail treating machine, in combination, a rotatable printing head, a cooperating rotatable platen, mean for rotating said printing head and platen, means for guiding an object to be printed upon between said printing head and platen, means including a roller for engaging and discharging objects after passage thereof between said printing head and platen, means mounting said roller for movement into and out of discharging position in relation to the path of travel of said object, a tape feeding device adapted to be placed in operative or inoperative condition, a tape moistening device, means mounting said tape moistening device for movement between operative and inoperative positions relative to said head and platen, a tape shearing device, means mounting said tape shearing device for movement between operative and inoperative positions relative to said head and platen, and operating means for placing said tape feeding device in operative condition, for placing said tape shearing and moistening devices in operative position, and for effecting movement of said roller out of its discharging position.

36. In a mail treating machine, in combination, a rotatable printing head, a cooperating rotatable platen, means for rotating said printing head and platen, means for guiding an object to be printed upon between said printing head and platen, means for engaging and discharging objects after passage thereof between said printing head and platen, means mounting portions of said discharging means for movement into and out of discharging position, a tape feeding device adapted to be placed in operative or inoperative condition, a tape moistening device, means mounting said tape moistening device for movement between operative and inoperative positions relative to said head and platen, portions of said tape moistening device occupying the same position when in operative condition as said portions of said discharging means when in discharging position, and operating means for placing said tape feeding device in operative condition, for placing said tape moistening device in operative position, and for effecting movement of said portions of said discharging means out of discharging position.

COMMODORE D. RYAN.
FRANK P. SAGER.